(12) United States Patent
Minegishi et al.

(10) Patent No.: US 6,874,947 B2
(45) Date of Patent: Apr. 5, 2005

(54) OPTICAL COMPONENT

(75) Inventors: Sadao Minegishi, Tochigi (JP); Toshikazu Yamaura, Komoro (JP)

(73) Assignee: Cimeo Precision Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/467,441

(22) PCT Filed: Feb. 6, 2002

(86) PCT No.: PCT/JP02/00961

§ 371 (c)(1), (2), (4) Date: Sep. 22, 2003

(87) PCT Pub. No.: WO02/071115

PCT Pub. Date: Sep. 12, 2002

(65) Prior Publication Data

US 2004/0076379 A1 Apr. 22, 2004

(30) Foreign Application Priority Data

Feb. 6, 2001 (JP) ............................ 2001-029524

(51) Int. Cl.[7] .............................................. G02B 6/36
(52) U.S. Cl. ...................................................... 385/78
(58) Field of Search .............................. 385/78, 80, 84

(56) References Cited

U.S. PATENT DOCUMENTS

| | | | | |
|---|---|---|---|---|
| 4,764,343 A | * | 8/1988 | Nyberg | 422/83 |
| 5,978,534 A | * | 11/1999 | O'Rourke et al. | 385/52 |
| 6,300,262 B1 | * | 10/2001 | Beall | 501/5 |
| 6,632,757 B2 | * | 10/2003 | Beall | 501/5 |
| 6,660,669 B2 | * | 12/2003 | Beall et al. | 501/5 |

FOREIGN PATENT DOCUMENTS

| | | | | |
|---|---|---|---|---|
| JP | 4-198059 | * | 7/1992 | C04B/35/10 |
| JP | 10-111433 A | | 4/1998 | |
| JP | 2000-321461 | * | 11/2000 | G02B/6/24 |

OTHER PUBLICATIONS

Kiyoshi Nakagawa et al., Light Amplifier and Applications Thereof, edited by Hideki Ishio, May 30, 1992, pp. 110–112, Ohm-sha, Tokyo, Japan, Partial.

* cited by examiner

Primary Examiner—Thanh-Tam Le
(74) Attorney, Agent, or Firm—Smith Patent Office

(57) ABSTRACT

Optical transmission lines in optical transmission systems or laser beam source-applied devices, which utilize optical fibers as optical transmission lines, are connected by optically coupling to an optical fiber terminal portion, which is configured by holding the vicinity of the optical fiber terminal portion with a capillary tube, a ferrule or the like at the connecting portions of the transmission lines. With this configuration, minimizing return loss at the optical fiber terminal portion is a key issue.

As a solution thereof, a capillary tube made of glass is used; however, since insertion by driving in or press fitting to a metallic tube or the like is impossible, mass production is impossible, accurate processing is impossible, and it is costly due to the characteristics of the glass, there are many restrictions in the usage thereof.

With the present invention, by utilizing as material for capillary tubes, translucent ceramics such as alumina ceramics that have not been conventionally considered in any way for using in this field, an optical fiber terminal portion, which can be processed with little return loss and high accuracy and is suitable for mass production, can be provided at low cost.

112 Claims, 7 Drawing Sheets

US 6,874,947 B2

OPTICAL COMPONENT

TECHNICAL FIELD

The present invention relates to an optical component for holding an optical fiber. In particular, it is related an optical component that holds an optical fiber by inserting the vicinity of an optical fiber terminal portion into a through-hole provided to the optical component, and that can be used when constructing the optical fiber inserted in the through-hole as well as the optical fiber terminal portion.

BACKGROUND ART

Along an optical fiber cable (hereafter, simply referred to as optical fiber) set over a great distance, which is used for optical communication and the like, is provided an amplifier, for example, which amplifies light signals.

There is such type of amplifier, which functions based on the principle of amplifying light signals by mixing a pump light with a light signal (for example, Document 1: Ohm-sha, Hideki Ishio, editor, "Light Amplifier and Applications Thereof", (May 30, 1992) pp. 110–112). This type of amplifier includes a forward pumped-type, reverse pumped-type, and bi-directional pumped-type (Document 1).

FIGS. 7A through 7C are diagrams for describing an optical system for a light amplifier, which utilizes a holding member also called a capillary tube as an optical component that holds the optical fiber. FIG. 7A is a diagram for describing a basic optical system, FIG. 7B is for describing a reverse pumped-type light amplifier, and 7C is for describing a forward pumped-type light amplifier.

With any type, an optical system 10 such as described while referencing FIG. 7A, for example, is applied when inputting a pump light to an optical fiber, which propagates light signals, is necessary. It should be noted that FIG. 7A is a side view for describing this basic optical system 10.

This optical system 10 comprises a first optical fiber 11, which propagates a light signal LS, a second optical fiber 13, which propagates a pump light LP, a holding member 15 as an optical component to which these optical fibers 11 and 13 are inserted and fixed, and a lens 17 and a reflective mirror 19 having filtering characteristics, which are sequentially located in front of the end faces of these optical fibers 11 and 13.

However, the first and the second optical fiber 11 and 13 are inserted in the holding member 15 so as to be mutually parallel. The reflective mirror 19 has characteristics of transmitting the light signal LS and reflecting the pump light LP.

This optical system 10 is utilized, for example, as described while referencing FIG. 7B when it is for a reverse pumped-type light amplifier. Namely, the pump light LP is input to the second optical fiber 13, and is then input to an amplifier 21 via the route from the lens 17, reflective mirror 19, lens 17, and first optical fiber 11. As the amplifier 21, for example, an erbium-doped (namely, doped with erbium) optical fiber amplifier is used.

Furthermore, this optical system 10 is utilized, for example, as described while referencing FIG. 7C when it is for a forward pumped-type light amplifier. Namely, the pump light LP is input to the second optical fiber 13, and is then input to the amplifier 21 via the route from the lens 17, reflective mirror 19, lens 17, and first optical fiber 11.

A conventional example of an optical component configured from such first and second optical fibers 11 and 13 and the holding member 15 is disclosed in Laid-open Japanese Patent Application No. 10-111433, for example. FIG. 8 is a diagram for describing an optical component 30, where the right diagram in the figure is a top view showing an end face of the optical component 30, and the left diagram is a cross-sectional view of the optical component 30 cut along the line X1–X2 of the top view, which is the aforementioned right diagram.

This optical component 30 comprises a short-diameter cylinder 31 as a holding member, a first optical fiber line through-hole 33, which passes through the center axis Q of this short-diameter cylinder 31, and a second optical fiber line through-hole 35, which passes through the short-diameter cylinder 31 parallel to the first optical fiber line through-hole 33 that is eccentric from the center axis, where the hole diameter of the first and the second through-hole 33 and 35 is respectively given as 126 $\mu$m.

Furthermore, center axis distance D1 for both through-holes 33 and 35 is given as 0.3 mm (paragraphs 11 and 15 of Laid-open Japanese Patent Application No. 10-111433). Accordingly, both through-holes 33 and 35 are respectively isolated holes.

The aforementioned holding member 31 itself is, as described in paragraph 10 of Laid-open Japanese Patent Application No. 10-111433, is completed as an optical component, which is also called a capillary tube, by casting a ceramic material such as zirconia using a method such as the so-called slip cast method, sintering it, and smoothing the through-hole inner surface through wire polishing or the like.

This capillary tube, as one implementation, for example, is inserted and held in one end of a through-hole of a component, which should be called a capillary tube fixture such as a metallic tube, so as to form an optical component, which is also called a ferrule.

Nevertheless, the holding member 31 that is made of ceramics including zirconia, which is used conventionally, has no transmission for light of wavelengths 0.5 to 2 $\mu$m. Accordingly, there is a big problem with the conventional holding member where, for example, in optical communication, in the case where a light signal of a wavelength in the vicinity of 1.5 $\mu$m, for example, strikes an end face of the holding member 31, that light signal is reflected diffusely thereat, and at least a portion of that signal becomes a return loss, as is described later.

FIG. 9 is a diagram describing ideal conditions of an optically coupling system between optical fibers and return loss, where the portion representing structural components such as a holding member and a lens is illustrated in a cross section.

In FIG. 9, reference numerals 50 and 60 are holding members, which respectively have at least one through-hole for holding an optical fiber; 50a and 60a are through-holes; 51 and 61 are core portions of the optical fibers; 52 and 62 are cladding portions of the optical fibers; 53 and 63 are metallic members holding the holding members 50 and 60, respectively; 54 and 64 are adhesive layers, which are used according to need; and 55 and 65 are surfaces orthogonal to the center axes of the respective through-holes 50a and 60a (hereafter, also referred to as orthogonal to the respective through-holes) at the end faces of each of the holding members 50 and 60. Reference numerals 57 and 59 are lenses, 58 is a filter, and 67 through 70 are lines indicating optical paths for light signals. Reference numeral 56 is an end face formed by tilting the end face 55, which is orthogonal to the through-hole 50a, 8 degrees clock-wise in the figure, and 66 is an end face formed by tilting the end face 65, which is orthogonal to the through-hole 60a, 8 degrees counter clock-wise in the figure. It should be noted that with FIG. 9, for convenience of explanation, the scale size of each part such as the holding members 50 and 60, the metallic members 53 and 63, the core portions 51 and 61, the cladding portions 52 and 62, the adhesive layers 54 and 64, the lenses 57 and 59, and the filter 58 are not the same, and also for convenience of explanation, they are illustrated with differing scales according to need.

With FIG. 9, light having progressed through the core portion 51 from left to right of the figure goes out to space from the end face 55 of the core portion, spreads into an optical beam as indicated by reference numeral 67 and passes through the lens 57, becoming parallel optical beams as indicated by reference numeral 68. It then passes through the filter 58 and becomes an optical beam as indicated by reference numeral 69, passes through the lens 59 becoming an optical beam as indicated by reference numeral 70, and finally enters the core portion 61.

However, the optical beam illustrated in FIG. 9 is an ideal one, where with actual optical coupling, the optical beam spreads more than illustrated in the figure, and all light having progressed towards the core portion 61 does not necessarily enter therein.

In practice, without all light progressing towards the core portion 61 entering the core portion 61, a portion thereof is reflected diffusely due to the cladding portion 62 or the holding member 60 or the like, where a portion thereof progresses reversely in the order of the lens 59, the filter 58, and the lens 57. This results in loss that is called a return loss.

With such an optically coupling system, minimizing this return loss is a key issue. A method that is implemented conventionally for that reason forms the end face 56 tilted 8 degrees by inserting and fixing in the through-hole 50a an optical fiber configured from the core portion 51 and the cladding portion 52 so that the end face 55 of the holding member 50 on the light emitting side can become the end face tilted 8 degrees as aforementioned, and then polishing the end face of the holding member 50 and the end face of the optical fiber configured from the core portion 51 and the cladding portion 52. Doing so may prevent adverse effects from the return light. Moreover, prevention of adverse effects from the return light is attempted by making the plane of incidence and the output plane of the filter 58 also tilt, as well as making the end face of the holding member 60, which holds the core portion 61 and the cladding portion 62 on the light receiving side, tilt 8 degrees as aforementioned into the end face 66.

Nevertheless, the adverse effects from the return light have not been resolved. Namely, as aforementioned, all of the light emitted from the optical fiber on the light emitting side does not have to be incident on the core portion 61 of the optical fiber on the light receiving side at the end face of the holding member 60, which configures the optical fiber terminal portion on the light receiving side, but a part of the light may be incident on the cladding portion 62 or the like as illustrated in FIG. 10.

FIG. 10 is a cross-sectional view for describing light that has entered a cladding portion.

In FIG. 10, reference numerals 71, 71a, 72, and 72a are lines respectively indicating light rays, and A1 and A2 are points indicating the positions thereof.

In FIG. 10, light progressing from left to right in the figure as indicated by reference numerals 71 and 72 enters the cladding portion 62 at the end face 66 of the holding member 60 on the receiving side and reflected at the core portion 61, progresses as indicated by the respective reference numerals 71a and 72a, and then reaches the periphery of the cladding portion 62 as indicated by A1 and A2, respectively. The cladding portion 62 is fixed with adhesive in the through-hole 60a. The inner surface of the through-hole 60a is a polished surface. The light indicated by the reference numerals 71a and 72a are reflected near the positions indicated by A1 and A2, respectively, of which a part becomes the aforementioned return loss.

This light that becomes a return loss partially returns to the light source, for example, and greatly disrupts the light-emitting condition of a laser diode as the light source; and a portion thereof provides adverse effects to light signals.

Presently in optical communication, it is important that the return loss due to this reflected light is small.

Another exemplary method attempting to reduce this return loss where the holding members 50 and 60 (also referred to as a capillary tube) are made of glass other than the conventional mainstream zirconia ceramics is proposed.

However, since a glass holding member cannot undergo hole processing and finishing through wire polishing (for example, cannot be given a glaze), finishing a hole with very close dimension tolerances as with a capillary tube is impossible, whereby it was manufactured by a method of stretching a thick glass tube with an outer diameter and a hole diameter analogous to those of a capillary tube. Accordingly, the glass holding member had large drawbacks when used for an optical fiber terminal where accurateness of optical coupling was poor due to poor accuracy in positioning the core portion, as well as being difficult to process.

Furthermore, in the case of using the glass holding member, for example, when attaching the glass holding member to the metallic member 63 of FIG. 9 or FIG. 10, the glass easily breaks, attaching through driving in (press fitting) is impossible, and fixing with an adhesive or the like is necessary, where in addition to poor accuracy in positioning each portion as compared to the case of attaching by driving in, light scatters due to the adhesive. Therefore, as aforementioned, the light that is not incident on the core portion 61 but is incident on the cladding portion 62 or the glass parts of the holding member 60 has drawbacks of being dispersed when reaching the boundary of the metallic member 63 by a scatterer such as an adhesive layer 64 that exists there, leading to an increase in return loss.

The present invention resolves such problems and provides an optical component as a holding member for holding an optical fiber terminal portion, which has small return loss, can be easily processed and handled, is suitable for mass production, and provides low manufacturing costs when used for optical communication by holding an optical fiber.

DISCLOSURE OF INVENTION

In order to reach the aim described above, an optical component of the present invention can be a configuration characterized by: a basic optical component that comprises a holding member, which is made of translucent ceramics and holds the vicinity of an end of, for example, an optical fiber, and a through-hole, which is formed in the holding member and into which the optical fiber is inserted; and a holding member, which is the basic optical component and is inserted and held in a holding member insert of a holding member fixture.

To begin with, the feature of the basic optical component of the present invention is described, and a feature of the optical component of the present invention where it is fixed to a holding member fixture is described next.

The translucent ceramics used for the present invention is characterized by excellent translucency for light in the wavelength band that allows an optical fiber holding the end of that through-hole to transmit that light, as well as, for example, when forming a capillary tube, that capillary tube can be fixed by driving in to a metallic tube or the like utilized for ferrules.

An exemplary optical component of the present invention is characterized by the average crystal grain diameter of the translucent ceramics configuring the holding member being 20 μm or greater. Making the average crystal grain diameter be 25 μm or greater is further preferable.

An exemplary optical component of the present invention is characterized by the diameter of each crystal grain within the portion making up at least 50% of the translucent ceramics volume being between 10 and 40 μm. Making the diameter of each crystal grain within the portion making up at least 70% of the translucent ceramics volume be 15 μm or greater particularly brings about significant effects.

An exemplary optical component of the present invention is characterized by total transmittance (described later) for the translucent ceramics configuring the holding member being at least 0.8 (namely 80%) for light of wavelengths between 0.3 and 5 μm.

An exemplary optical component of the present invention is characterized by linear transmittance (described later) of the translucent ceramics configuring the holding member being at least 0.15/mm (15% per 1 mm in thickness) for light of wavelengths between 0.5 and 2 μm.

An exemplary optical component of the present invention is characterized by 99.9% or greater of alumina ($Al_2O_3$) by weight being included in the translucent ceramics configuring the holding member as the principal components thereof. In the case of manufacturing translucent alumina ceramics, a highly translucent ceramics may be obtained using a synthetically manufactured high-purity alumina ($Al_2O_3$) with a purity of 99.99%.

An exemplary optical component of the present invention is characterized by 200 to 300 ppm magnesium (Mg) by weight being included in the translucent ceramics configuring the holding member. In this case, the content of magnesium preferably follows the aforementioned range from the viewpoint of translucency and processability of the translucent ceramics, and also preferably contains less silicon, iron, sodium, calcium, and potassium and the like for heightening its translucency.

According to an exemplary optical component of the present invention, the composition of a translucent alumina ceramics configuring the holding member favorably has content ratios of at least 99.95% alumina ($Al_2O_3$), approximately 250 ppm magnesium (Mg), and approximately 50 ppm silicon (Si) or less by weight, and less than 1 ppm for each of the elements iron (Fe), sodium (Na), calcium (Ca), and potassium (K).

There are cases where an exemplary optical component of the present invention has one through-hole and two or more through-holes.

In the case where the through-hole exists in singular, if the cross section thereof is made to be circular and is formed in the holding member such that the center axis of the through-hole coincides with the axis of the holding member, there are especially great effects in reducing return loss, heightening the processing accuracy, increasing yield, and lowering costs according to the present invention.

In the case where two or more of the through-hole exist, the present invention can bring about great effects by making the cross-sectional shape of at least one through-hole be circular.

The optical component using translucent ceramics of the present invention, in the case of configuring a ferrule by fixing it to a metallic member such as a metallic tube, is capable of fixing by driving in that was not possible with a glass optical component, where adhesive does not need to lie between the optical component and the metallic component, one contributing factor of return loss may be eliminated as well as positional accuracy of the core portion may be further heightened, and further promoting the reduction in return loss.

Moreover, increasing the positional accuracy of an optical fiber to be fixed to the optical component is essential for effectively promoting the reduction in return loss according to the present invention.

A particularly preferable example of an optical component with two through-holes according to the present invention as that example is characterized by the holding member including: a first through-hole; a second through-hole, which is formed in the holding member with a positional relationship where a slit having a width less than the diameter of the first through-hole is linked to the first through-hole such that it is formed along the length of the first through-hole, and which has a diameter larger than that of the first through-hole; and the slit.

With the exemplary optical component of the present invention, the width of the slit should preferably be no greater than 70% of the diameter of the first through-hole, and the width of the slit should preferably be at least 20% of the diameter of the first through-hole.

It is preferable that the first through-hole is formed in the holding member such that within the portion from at least one end thereof for a specified length the center axis of the first through-hole coincides with the axis of the holding member, and that the second through-hole is formed in the holding member such that the slit is formed with a uniform width across the entire length of the first through-hole.

The upper limit for the diameter of the second through-hole of an optical component according to the present invention is a value within a range defined by the surface tension of the adhesive that, when a liquid adhesive is injected into either one or both of the first and the second through-hole in a state where an optical fiber is inserted into each of the first and the second through-hole, can make the optical fiber within the second through-hole be parallel and close to the optical fiber within the first through-hole.

An exemplary optical component of the present invention is characterized by: a first through-hole and a second through-hole, which differ in inner diameter and into which ends of optical fibers are to be inserted and are formed in parallel and close to each other as the through-holes; and a slit, which links the first through-hole and the second through-hole at the boundary therebetween and is formed along these through-holes such that the outer surface of a second optical fiber inserted into the second through-hole may touch or be close to the outer surface of a first optical fiber inserted into the first through-hole while rubbing the inner surface of the first through-hole, which is formed with a smaller inner diameter than that of the second through-hole; where the first through-hole is formed in the holding member such that the center axis of the first through-hole coincides with the axis of the holding member.

According to an exemplary optical component of the present invention, when utilizing that optical component, even greater effects are demonstrated by forming at least one mark portion that allows definition of the position of the holding member or of a through-hole provided therein relative to a reference position already defined by an optical system that utilizes the optical component of the present invention.

The mark portion may be used as a reference surface formed along a part of the circumference of the holding member.

Furthermore, an exemplary optical component of the present invention is characterized by a guide portion, which acts as a guide for inserting the first and the second optical fiber into the first and the second through-hole, respectively, provided to an end of the holding member on the side where the first and the second optical fiber is to be inserted (namely, the opposite side to the side where the end face of the optical fiber is located after the optical fiber has been attached). In addition, the guide portion is, for example, a hole formed at the end of the holding member, and has a wider opening than the inlet of the first and the second through-hole, as well as having a surface inclined towards that inlet, thereby lowering processing costs and improving workability.

An exemplary configuration where the design diameter of the first and the second optical fiber of an optical component according to the present invention is 125 $\mu$m is characterized by: the center axis distance between the first and the second through-hole being between 119 $\mu$m and 132 $\mu$m; the diameter of the first through-hole being between 125 $\mu$m and 129 $\mu$m, and the diameter of the second through-hole being at least 130 $\mu$m; where it is especially preferable that the diameter of the second through-hole is between 140 $\mu$m and 156 $\mu$m. It is especially preferable that the width of the slit is between 30 $\mu$m and 80 $\mu$m.

Furthermore, an exemplary optical component with three through-holes according to the present invention is characterized by a third through-hole as well as the first and the second through-hole in the holding member; wherein the third through-hole is formed in the holding member with a positional relationship where a slit having a width of dimensions less than the diameter of the first through-hole is linked to the first through-hole such that it is formed along the length of the first through-hole, and has a diameter larger than that of the first through-hole; and in the case of an optical component utilized for optical fibers with a design diameter of 125 $\mu$m, the center axis distance between the first and the third through-hole is between 119 $\mu$m and 132 $\mu$m, the diameter of the first through-hole is between 125 $\mu$m and 129 $\mu$m, and the diameter of the second and the third through-hole is at least 130 $\mu$m In addition, it is preferable that the diameter of the second and the third through-hole of the case mentioned above is set between 140 $\mu$m and 156 $\mu$m. Furthermore, it is especially preferable that the width of the slit formed between the first through-hole and the third through-hole is set between 30 $\mu$m and 80 $\mu$m.

Usage of the exemplary optical component with three through-holes according to the present invention for an optical system provides greater effects such as easier positioning when the segment linking the center axis of each of the three aforementioned through-holes is a straight line, when it is an L-shape forming an 90 degree angle, and when it is a bent line forming a 120 degree angle, or the like.

Moreover, the present invention may be used for an optical component having four or more through-holes, whereby return loss can be greatly reduced.

Furthermore, it is not always necessary to use all the through-holes of the optical component according to the present invention for holding optical fibers; they may be used to avoid return light while there is no optical fiber attached to a specified through-hole.

While features of the basic optical component of the present invention have been described thus far, the optical component of the present invention is capable of demonstrating great effects by utilizing each aspect of the present invention having each type of feature as described above in appropriate combinations thereof, or independently.

Next, features of an optical component of the present invention where a holding member, which is a basic optical component such as ferrule, is held in a holding member fixture having a holding member insert are described. The optical component of the present invention as described below holds the feature of at least one example of a basic optical component according to the present invention as well as each feature described below, which is apparent from the descriptions given above and below.

An exemplary optical component of the present invention is an optical component that holds the vicinity of an end of an optical fiber; wherein: the optical component is made up of a holding member, which is made of translucent ceramics and holds the optical fiber by inserting and fixing it, and a holding member fixture, which has a holding member insert for inserting, fixing and holding the holding member; the holding member is provided with a through-hole into which an optical fiber is inserted and held; the average crystal grain diameter of the translucent ceramics configuring the holding member is 20 $\mu$m or greater; and the diameter of crystal grain in the portion making up at least 50% of the translucent ceramics volume lies between 10 and 40 $\mu$m.

An exemplary optical component of the present invention is characterized by the holding member insert being a hole in the holding member fixture.

An exemplary optical component of the present invention is characterized by the holding member insert that is provided to the holding member fixture being formed with shape and dimensions that allow the holding member to be fixed and held in the holding member insert by inserting the holding member by a press fit or drive means or the like without usage of an adhesive.

An exemplary optical component of the present invention is characterized by 99.9% or greater of alumina ($Al_2O_3$) and 200 to 300 ppm of magnesium (Mg) by weight being included in the translucent ceramics configuring the holding member as the principal components thereof.

An exemplary optical component of the present invention is characterized by the holding member fixture having through-holes configured from a first hole in the holding member fixture, which is the holding member insert, and a second hole, which is subsequently formed and into which the holding member is not inserted.

An exemplary optical component of the present invention is characterized by the holding member fixture being made of metal, a part of an optical fiber protruding from the holding member being inserted into the second hole, and the inner diameter of the first hole being formed with dimensions slightly smaller than the outer diameter of the holding member.

An exemplary optical component of the present invention is characterized by the alumina ($Al_2O_3$) content by weight in the translucent ceramics that configures the holding member being 99.95% or greater, and the magnesium (Mg) content by weight being approximately 250 ppm.

An exemplary optical component of the present invention is characterized by total transmittance or the ratio of the total amount of light passing through the translucent ceramics, which configure the holding member, to the total amount of incident light being at least 0.8, namely 80% for light of wavelengths between 0.3 and 5 μm, and linear transmittance, which is transmittance in the direction to which the incident light progresses through the translucent ceramics configuring the holding member, being at least 0.15/mm, namely 15% per 1 mm in thickness for light of wavelengths between 0.5 and 2 μm.

In addition, the example of using the holding member fixture of the present invention can be configured with features resulting from adequately combining each aforementioned feature, and as described above, can hold at least one feature of the basic optical component according to the present invention.

By configuring the terminal portion of an optical fiber using such optical component of the present invention, a high-precision optical fiber end with little return loss can be provided at low cost under conditions suitable for mass production.

BEST MODE FOR CARRYING OUT THE INVENTION

Figure 1:
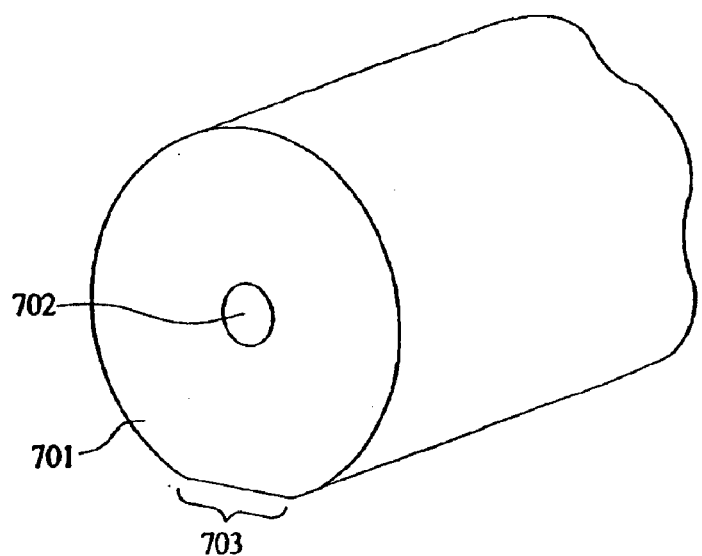
FIG. 1 is a partial oblique perspective view for describing an optical component of an embodiment.

Hereafter, an embodiment of the present invention is described while referencing the drawings. It should be noted that each diagram applied to the description gives an outline of the dimensions, shapes, positional relationships and the like of each structural component to a certain degree that facilitates understanding of the present invention, however, since there are cases where the magnification is partially changed within the drawing for convenience of explanation, there are also cases where prototypes or descriptions of the embodiment or the like are not always analogous. Furthermore, duplicate description with identical numbers for the same structural components that appear in the drawings may be omitted.

FIG. 1 is a partial oblique perspective view for describing an optical component 700 comprising one through-hole, which is an optical component of an embodiment of the present invention. This optical component 700 comprises a holding member 701, which is made of translucent ceramics, and a through-hole 702, which is formed in this holding member 701.

Moreover, this optical component 700 comprises a mark portion 703, which is useful when attaching this optical component to a metallic member (not shown in the drawing) such as a metallic tube under specified conditions. The holding member 701 is made of translucent alumina ceramics including more than 99% of alumina ($Al_2O_3$) by weight as the principal component.

The alumina ceramics forming this holding member 701 includes 200 to 300 ppm magnesium (Mg) by weight, where the silicon (Si) content ratio is less than 50 ppm, and the content ratio of each of the elements iron (Fe), sodium (Na), calcium (Ca), and potassium (K) is less than 1 ppm. In the case of manufacturing such translucent alumina ceramics, a highly translucent alumina ceramics may be obtained by using a synthetically manufactured high-purity alumina with a purity of 99.99%.

In addition, the holding member 701 is formed by preparing a material having the above-mentioned composition that is obtained by sintering, casting it into specified outer dimensions thereof and the through-hole 702 of specified dimensions, and sintering, and then processing the through-hole and the outer shape according to need.

At this time, by making the average crystal grain diameter of the alumina ceramics forming the holding member 701 be at least 20 μm, favorable transmittance for light to be described later may be obtained.

Describing in detail the crystal grain diameter of ceramics is difficult, however, as one depiction, by making the diameter of each crystal grain making up at least 50% of the translucent ceramics volume lie between 10 and 40 μm, translucency to be described later may be further heightened. The translucency of this translucent alumina ceramics may be heightened by increasing the grain diameter to a certain degree, and due to other properties and cost, an average crystal grain diameter of 20 μm or more is favorable.

Specifically, a translucent alumina ceramics with a composition favorably including at least 99.95% alumina ($Al_2O_3$) by weight, approximately 250 ppm magnesium (Mg), approximately 40 ppm silicon (Si), and a content ratio of less than 1 ppm for each of the elements iron (Fe), sodium (Na), calcium (Ca), and potassium (K), demonstrates great results on the present invention. In addition, upon making the average crystal grain diameter be at least 25 μm, manufacturing a holding member made of alumina ceramics with excellent translucency became possible.

In the case of manufacturing this translucent alumina ceramics, as mentioned above, the optical component of the present invention having exceptional characteristics can be obtained by using a synthetically manufactured alumina (Al$_2$O$_3$) with a purity of 99.99% or greater.

Next, the optical transmittance of this translucent alumina ceramics used for the optical component of the present invention will be described.

Here, the term optical transmittance used with the present invention will be defined.

With the present invention, as transmittance for light, the terms linear transmittance and total transmittance are used.

Linear transmittance referred to with the present invention denotes the ratio of outgoing light to incident light, where the incident light progressing from one of the sides perpendicular to, for example, a parallel flat plate with a predetermined thickness is incident on the parallel flat plate, passes through the parallel flat plate, and then exits in the same direction as the direction in which the incident light progresses. On the other hand, total transmittance referred to with the present invention denotes the ratio of the total amount of transmitted light to the total amount of incident light, where the total amount of transmitted light denotes part of the light issued from a tubular light source that has passed in all directions through a 1.5 mm-thick translucent ceramic tube, which accommodates that tubular light source.

Upon measuring the optical transmittance of the alumina ceramics with each of the aforementioned compositions applied to the present invention, of the transmittance for light with wavelengths ranging between 0.3 and 5 μm, the linear transmittance is at least 0.1/mm (namely, 10% per 1 mm in thickness) and the total transmittance is at least 0.8 (namely, 80%); and of the transmittance for light with wavelengths ranging between 0.5 and 2 μm, the linear transmittance is at least 0.15/mm and the total transmittance is at least 0.8 (namely, 80%).

Figure 2:
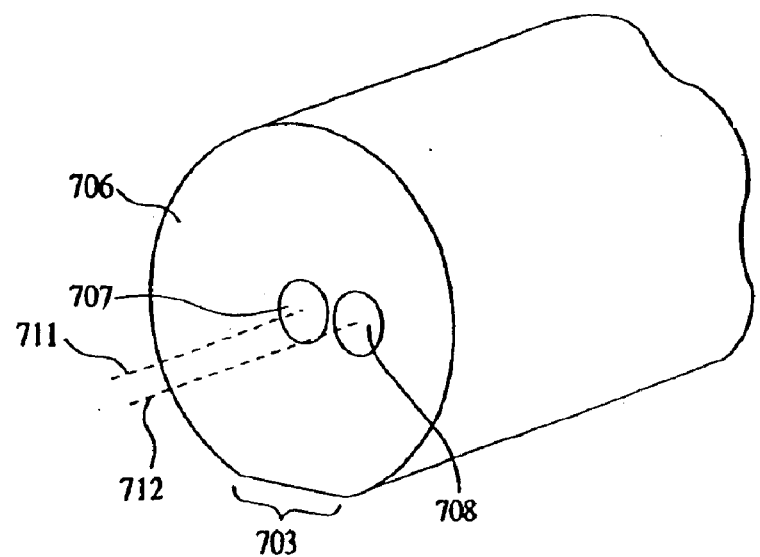
FIG. 2 is a partial oblique perspective view for describing an optical component of an embodiment of the present invention.

FIG. 2 is a partial oblique perspective view for describing an optical component of an embodiment of the present invention, that is, an optical component 705 having two through-holes, which is. In FIG. 2, reference numeral 706 is a holding member, and 707 and 708 are first and second through-holes provided to the holding member 706. The holding member 706 is made of translucent ceramics having the same properties as the holding member 701 of FIG. 1, and has a mark portion 703, which may be used as a reference surface. In addition, the reference surface acting as the mark portion 703 of the holding member 706 is a surface parallel to a linking surface between a center axis 711 of the first through-hole 707 and a center axis 712 of the second through-hole 708, and may be formed across the entire length of the holding member 706 (namely, along the center axis of the holding member 706), or it may alternatively be formed along a portion of the length thereof.

As an implementation of the first and second through-holes, the first and second through-holes may be used for a light amplifier, for example, by inserting a first and a second optical fiber into the through-holes, respectively, where the first optical fiber is used for light signal input, and the second optical fiber is used for reverse pumped-type pump light; or an optical fiber may be inserted to the first through-hole so as to perform transmission of the light signal, where nothing is inserted to the second through-hole, or a material with low optical reflectance is filled therein so as to further reduce return loss; however, the implementation thereof is not limited to this, and there are various alternative implementations thereof.

Furthermore, by forming the center axes of the through-hole 702 and through-hole 707 so as to coincide with the center axes of the holding members 701 and 706, respectively, accuracy of processing such as shape, dimensions or position of the through-holes, or outer dimensions of the holding member may be improved. As a result, this brings about significant effects where positional accuracy of the core of the optical fiber inserted in the through-hole may be improved, and improvement in production yield as well as significant reduction in manufacturing cost of the optical component is possible.

In the case where the center axes of the through-holes 702 and 707 are formed to coincide with the center axes of the relevant holding members, once the holding members are formed and sintered so as to have outer shapes and through-holes with predetermined shapes and dimensions, to begin with, the internal sides of the through-holes 702 and 707 are processed by wire polishing or the like and finished to desirable shapes, dimensions and surface conditions and the like. Next, relative to the through-holes 702 and 707, the outer shape, dimensions and mark portion required by the holding member, and in the case of holding member 706, the shape, dimensions and surface conditions and the like of the through-hole 708 may be accurately and easily processed and finished.

Thus far, the optical component in the cases of having one through-hole and having two through-holes, according to embodiments of the present invention, have been described using FIG. 1 and FIG. 2. In addition, usage of these optical components according to the present invention has allowed the return loss for the optically coupling system using optical fibers to be drastically reduced.

Nevertheless, according to studies by the inventors, in order to further effectively reduce return loss, further improvements are desired, such as heightening the positional accuracy of the optical fiber core portion, which is held by the holding member, relative to the holding member, in addition to using the aforementioned translucent ceramics as the material for the holding member. An exemplary optical component of the present invention that has solved this problem is described in detail forthwith.

Figure 3A:
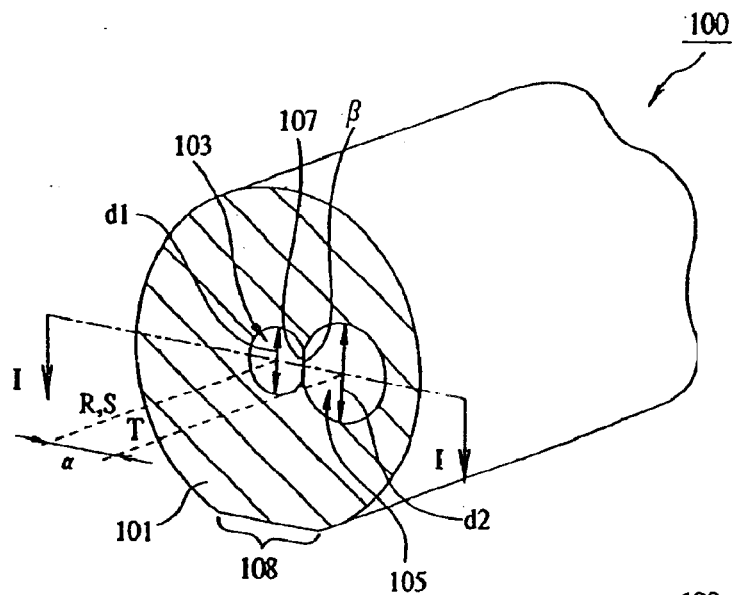
FIG. 3A is a diagram for describing an optical component of an embodiment of the present invention, and is a partial oblique perspective view of the optical component seen from the end face side of an optical fiber when the optical fiber is inserted.
Figure 3B:
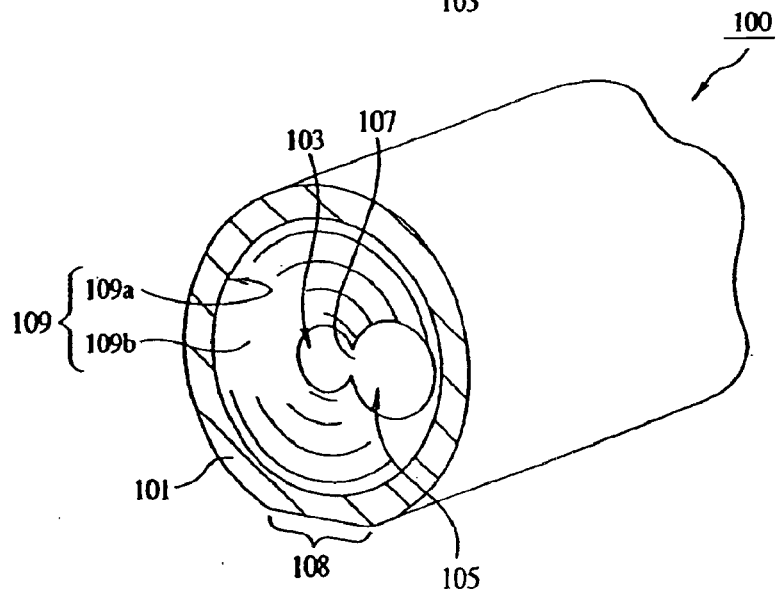
FIG. 3B is a diagram for describing the optical component of an embodiment of the present invention, and is a partial oblique perspective view thereof seen from the side on which the optical fiber is inserted.
Figure 3C:
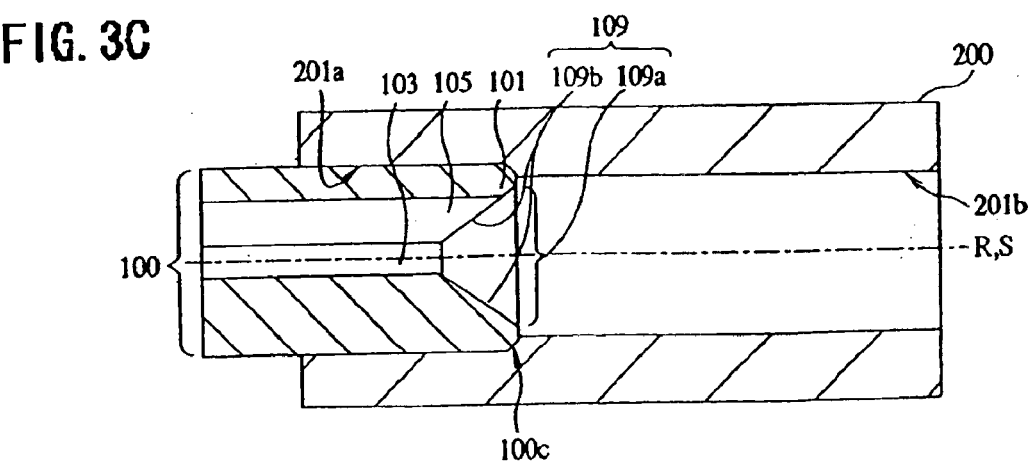
FIG. 3C is a diagram for describing the optical component of an embodiment of the present invention, and is a cross section of the configuration where the optical component is fixed to a metallic tube.

FIGS. 3A through 3C are diagrams describing an optical component 100 of an embodiment of the present invention, where FIG. 3A is a partial oblique perspective view of the optical component seen from an end face side of an optical fiber when the optical fiber is inserted into a through-hole of the optical component of the present invention; FIG. 3B is a partial oblique perspective view of the optical component seen from the opposite side to the end face side of the optical fiber, namely the side on which the optical fiber is inserted; and FIG. 3C is a cross section of a ferrule configured by attaching an optical component to a metallic tube. This optical component 100 comprises a holding member 101, a first through-hole 103, a second through-hole 105, and a slit 107, which are formed in this holding member 101. Moreover, this optical component 100 comprises a mark portion 108.

The holding member 101 is a member into which two optical fibers can be inserted. This holding member 101 may be made of, for example, the translucent alumina ceramics using the material with the aforementioned composition.

The shape, length (dimension along the center axis) and thickness of this holding member 101 may be an arbitrary shape, length and thickness in accordance with design. For example, with this embodiment but not limited thereto, the holding member 101 has a columnar shape and a length of 0.1 to 10 mm, 3 mm in this example, and a diameter of 0.7 to 3 mm, 1.4 mm in this example. If the holding member 101 has a columnar shape, this optical component 100 is convenient for fixing to another component (for example, a metallic tube 200 to be described later) or the like.

Furthermore, the first through-hole 103 is formed in the holding member 101 such that its center axis S corresponds to the axis R of the holding member 101 (it may also be the case of practically corresponding thereto). This first through-hole 103 is a through-hole into which a first optical fiber (see FIG. 4) can be inserted. It should be noted that the configuration of the optical fiber to be inserted into the first through-hole 103 should generally and preferably be, but not limited to, configuration where a primary cladding of an optical fiber line is removed, namely configuration made from a core and cladding.

If the optical component 100 of this embodiment is used as the optical component for a light amplifier utilizing pump light, it is preferable to use the first optical fiber to be inserted in this first through-hole 103 as the light signal optical fiber.

This first through-hole 103 is a through-hole with a circular cross-sectional shape. Note that although it is circular, since there is a slit 107, it is not a perfect circle, but is a shape where the part corresponding to the slit 107 is notched. In this case, cross section refers to a cross section crossing the center axis S of the first through-hole 103. Furthermore, it is preferable that the diameter of this first through-hole 103 has comparatively close tolerance relative to the diameter of the first optical fiber to be inserted in this through-hole 103. This emanates from the fact that due to the first optical fiber to be inserted into the first through-hole 103 often used for light signal propagation or the like, making the aforementioned tolerance be close allows high precision fixation of the first optical fiber (light signal optical fiber) to the holding member 101 as well as another through-hole to be processed relative to the aforementioned first through-hole, thereby significantly heightening the accuracy of the optical coupling between each optical fiber as well as effectively reducing return loss that has occurred due to usage of the aforementioned translucent ceramics as the material of the holding member 101.

According to tests by the inventors of the present invention, in the case where the design diameter of the first optical fiber (a portion made from a core and cladding) is, for example, 125 $\mu$m, it is preferable to set diameter d1 of the first through-hole 103 to a value lying in the range between 125 and 132 $\mu$m, more preferably lying in the range between 125 and 129 $\mu$m; however, the present invention is not limited to these values.

Moreover, it is preferable to make the inner surface of this first through-hole 103 be a surface with sufficiently improved smoothness. This is because the allowance given for the inner diameter of the first through-hole 103 relative to the diameter of the first optical fiber is comparatively small, as mentioned above. Accordingly, making the inner surface of the first through-hole 103 be in a good smooth condition makes it easier to insert the first optical fiber into the first through-hole 103.

Furthermore, the second through-hole 105 is formed in the holding member 101 with a positional relationship where a slit 107 having a width less than the diameter of the first optical fiber is linked to the first through-hole such that it is formed along at least a part of the length (the entire length in this example) of the first through-hole 103. In addition, the second through-hole 105 is a through-hole with a circular cross-sectional shape with the aforementioned notched slit portion, and has a diameter larger than that of the first through-hole 103.

More preferable is to make this through-hole have a diameter larger than that of the first through-hole 103. However, the diameter of this second through-hole 105 is naturally larger than the outer diameter of the second optical fiber to be inserted in this through-hole 105. By doing so, in the case where adhesive for fixing an optical fiber is poured into the first and the second through-hole 103 and 105, the optical fiber can move easier within the second through-hole 105 due to the surface tension of the adhesive, which will be described later.

This second through-hole 105 naturally has a diameter upper limit. Specifically, the upper limit diameter for the second through-hole 105 is determined such that the second optical fiber to be inserted in the second through-hole 105 can be located within a range that allows the surface tension of the adhesive to draw the second optical fiber to the first optical fiber that is to be inserted in the first through-hole 103.

According to tests by the inventors of the present invention, in the case where the design diameter of the second optical fiber is 125 $\mu$m, for example, it is preferable to set diameter d2 of the second through-hole 105 to at least 130 $\mu$m, more preferably lying in the range between 140 $\mu$m and 156 $\mu$m; however the present invention is not limited to these values.

However, it is assumed that the conditions where d1<d2 with respect to the diameter d1 of the first through-hole 103 described above, and where the width of the slit formed between the first and the second through-hole 103 and 105 is smaller than d1 are fulfilled.

Figure 4:
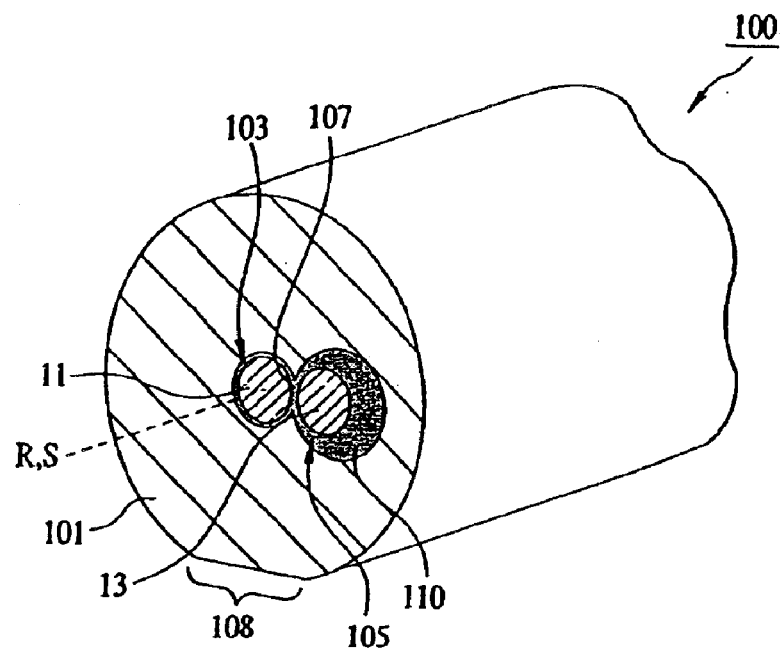
FIG. 4 is a diagram for describing a condition where an optical fiber is inserted and fixed in an optical component of an embodiment of the present invention.

This second through-hole 105, as one application thereof, is a through-hole for inserting the second optical fiber (see FIG. 4). It should be noted that the configuration of the optical fiber to be inserted into the second through-hole 105 is not limited to this configuration. Typically, it is preferable that a primary cladding of an optical fiber line is removed, namely configuration made from a core and cladding.

If the optical component 100 of this embodiment is used as the optical component for a light amplifier utilizing pump light, it is preferable to utilize the second optical fiber to be inserted in this second through-hole 105 as the pump light optical fiber.

Moreover, if the inner diameter of this second through-hole 105 is made to be a certain degree greater than the outer diameter of the second optical fiber, the inner surface of this second through-hole 105 may be a certain degree less smooth than the inner surface of the first through-hole 103. In an extreme case, it may also be a surface not subjected to wire polishing. This is because in the case where the inner diameter of the second through-hole 105 is larger than the outer diameter of the second optical fiber, the second optical fiber can be easily inserted into the second through-hole 105 although the inner surface of the second through-hole 105 is somewhat rough.

Furthermore, the center axis distance a (refer to FIG. 3) between the first through-hole 103 and the second through-hole 105 is the distance between the center axis S of the first through-hole 103 and the center axis T of the second through-hole 105, and is determined in accordance with design such that the slit 107 can be formed between these first and second through-holes 103 and 105, and width B of the slit 107 can be set as an appropriate value less than the diameter of the first optical fiber, yet an optical fiber can be inserted into the through-holes 103 and 105, respectively.

It should be noted that an appropriate value for width B of the slit 107 is a value that allows the adhesive force (surface tension) to work between the first optical fiber to be inserted into the first through-hole 103 and the second optical fiber to be inserted into the second through-hole 105 and prevents the optical fiber inserted into the first through-hole 103 from disengaging the first through-hole 103. Such value is determined either experimentally or theoretically. According to tests by the inventors, the width of the slit 107 should preferably lie between 20% and 70% of the diameter of the first through-hole 103.

As yet another preferable condition, when the design diameter of the optical fiber (the portion made from a core and cladding) is 125 μm, according to tests by the inventors, it is understood that the width of the slit 107 is more preferably set between 30 μm and 80 μm.

Figure 7A:
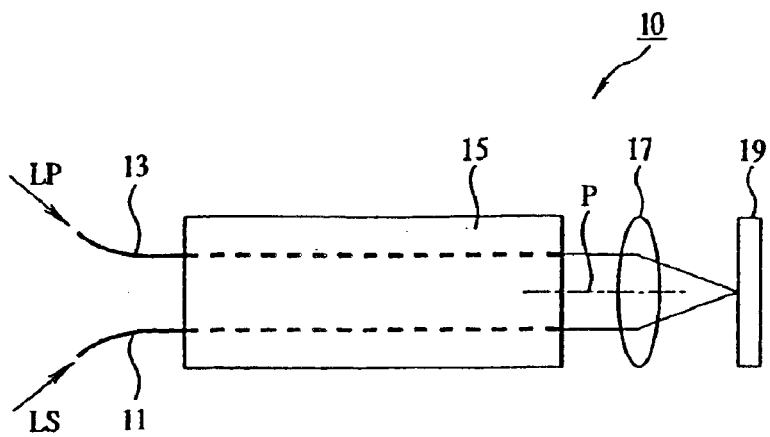
FIG. 7A is a diagram for describing a basic optical system for the optical system of a light amplifier.
Figure 7B:
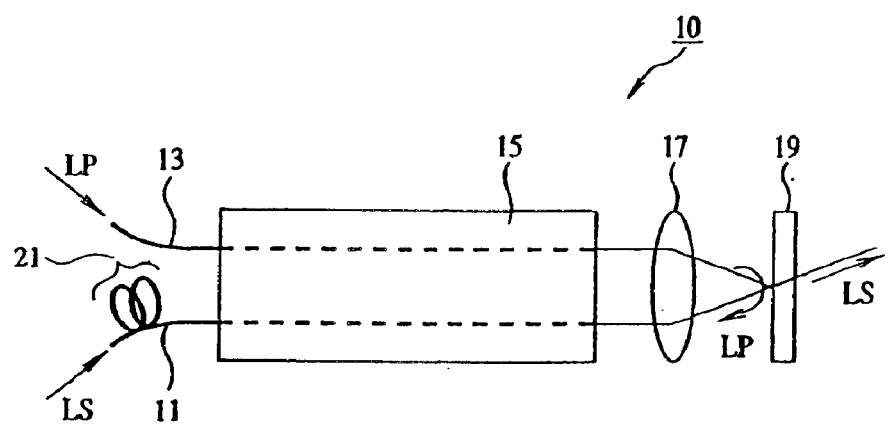
FIG. 7B is a diagram for describing a reverse pumped-type light amplifier.
Figure 7C:
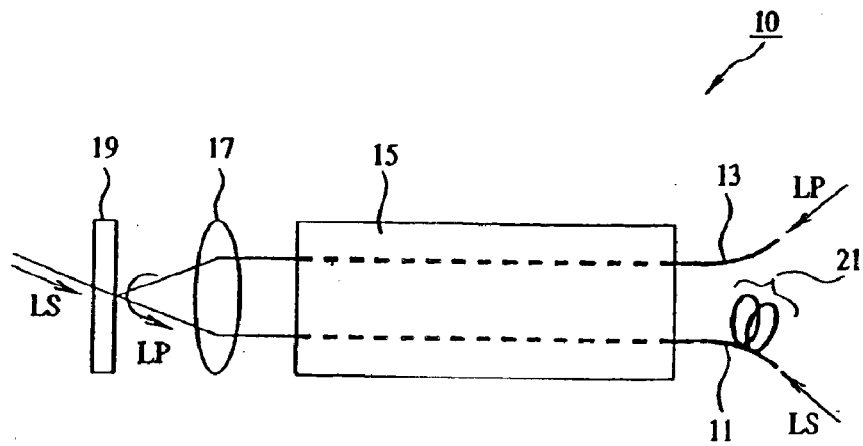
FIG. 7C is a diagram for describing a forward pumped-type light amplifier.
Figure 8:
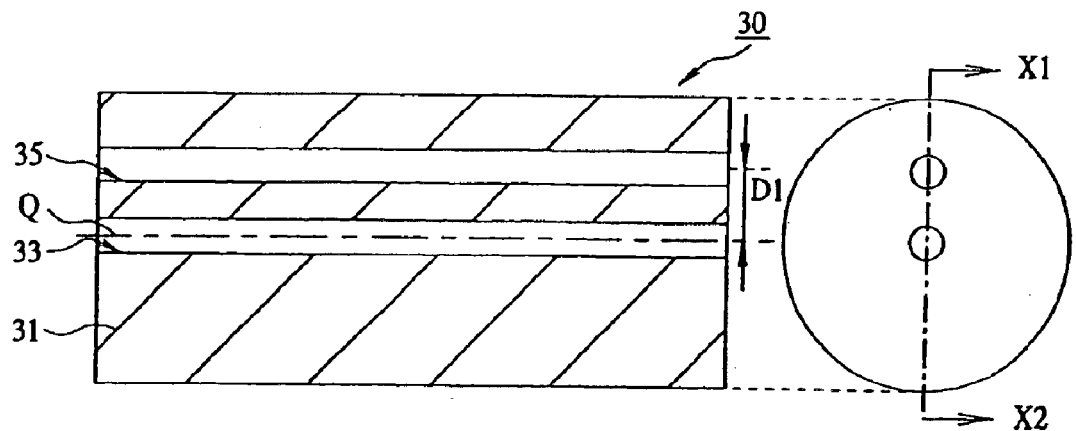
FIG. 8 is a diagram for describing a typical optical component.
Figure 9:
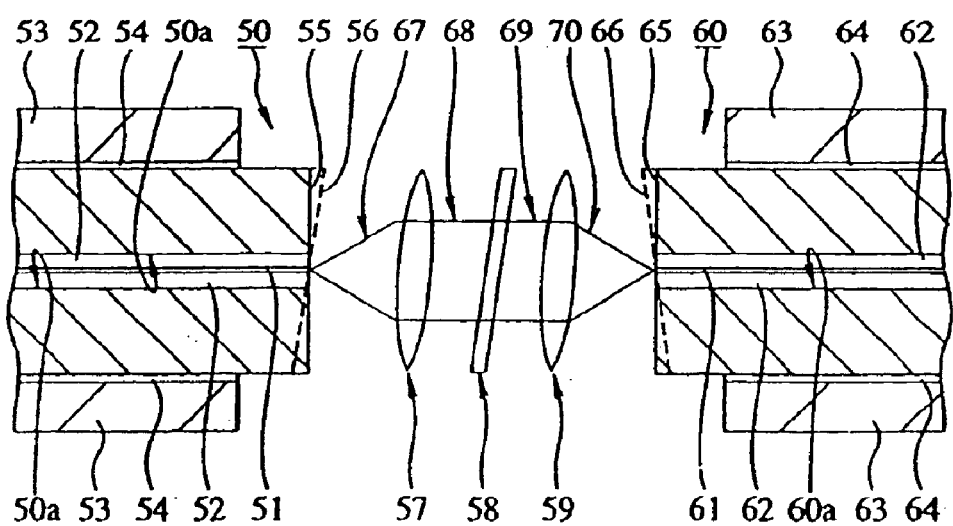
FIG. 9 is a diagram for describing ideal conditions of optical coupling between optical fibers and return loss.
Figure 10:
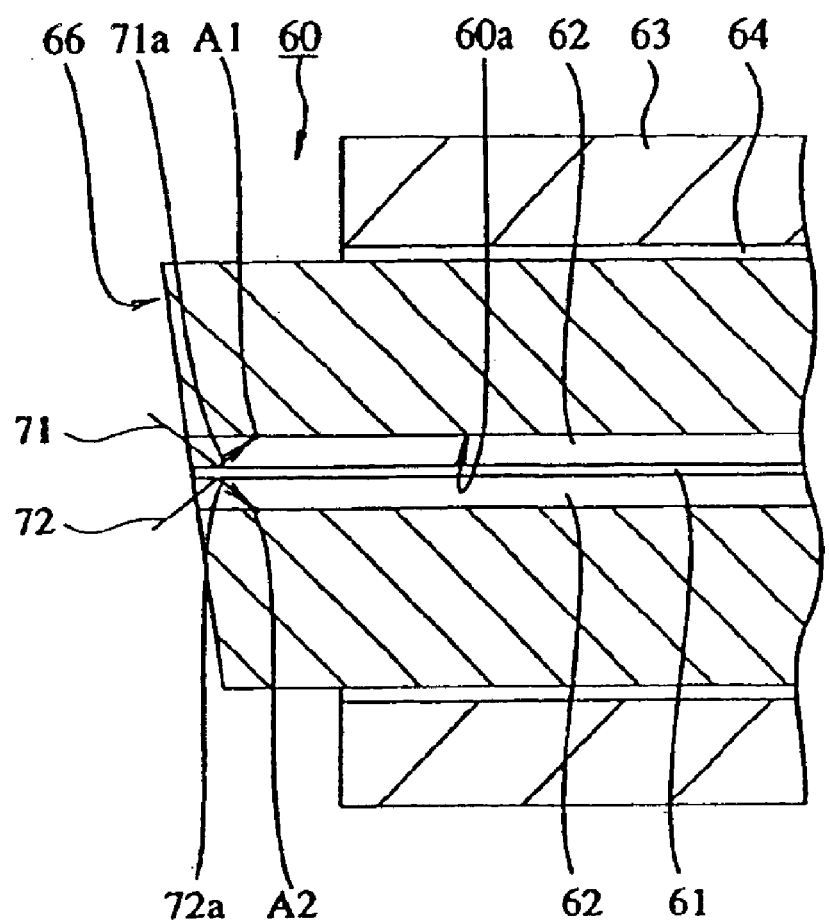
FIG. 10 is a diagram for describing light incident on a cladding portion.

Furthermore, the mark portion 108 is for defining the position of (facilitating positioning of) the aforementioned first and second through-holes 103 and 105 relative to the reference position already defined in an optical system that utilizes the optical component 100. More specifically, it may be utilized for positioning such that the optical positions of the first and the second through-hole 103 and 105 have a predetermined relationship relative to another optical component such as the lens 17 or the reflective mirror 19 described while referencing FIG. 7, for example.

The location, number, and structure for establishing this mark portion 108 may be an arbitrary location, number, and structure as long as the aforementioned aim can be reached. With this embodiment, a reference surface based on a predetermined relationship, such as making it be parallel or perpendicular, for example, to the line linking each center axis of the first and second through-holes 103 and 105, is provided along a part of the circumference of the holding member 101, where this reference surface is assumed as the mark portion.

With this embodiment, a flat surface 108 intersecting at least one end face of the holding member 101 is given as this type of reference surface, where the intersecting line of the end face and flat surface is parallel to the line linking the center axes S and T of the first and second through-holes 103 and 105 at this one end face.

It should be noted that this flat surface 108 may extend to reach the other end face of the holding member 101, or it may end partway along the length thereof. Typically, it is the former case. Furthermore, this flat surface 108 is preferably made parallel to the center axis of the holding member 101. This emanates from the fact that it is easier to position the optical component relative to other optical components with further accuracy by doing so.

Furthermore, instead of the reference surface 108 illustrated in FIG. 3, a reference surface orthogonal to this reference surface 108 may be provided along at least a part of the circumference of the holding member 101. Namely, a flat surface, which is perpendicular to the line linking the center axes of the first and second through-holes 103 and 105 of at least one of the terminal portions of the holding member 101, is formed along at least a part of the circumference of the holding member 101, where this flat surface may be assumed as the reference surface.

Figure 6A:
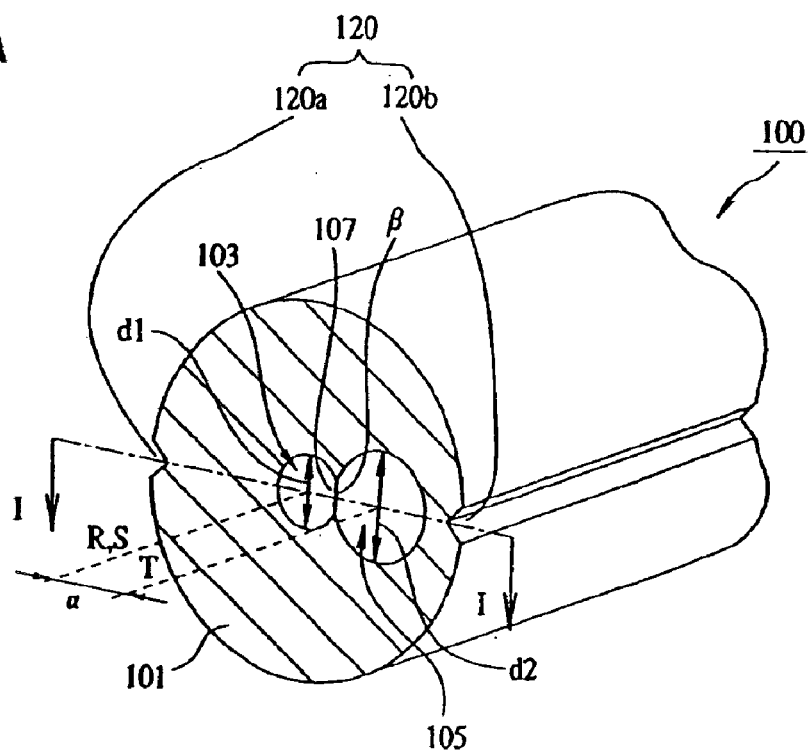
FIG. 6A is a diagram for describing a structural example of a mark portion of the present invention.
Figure 6B:
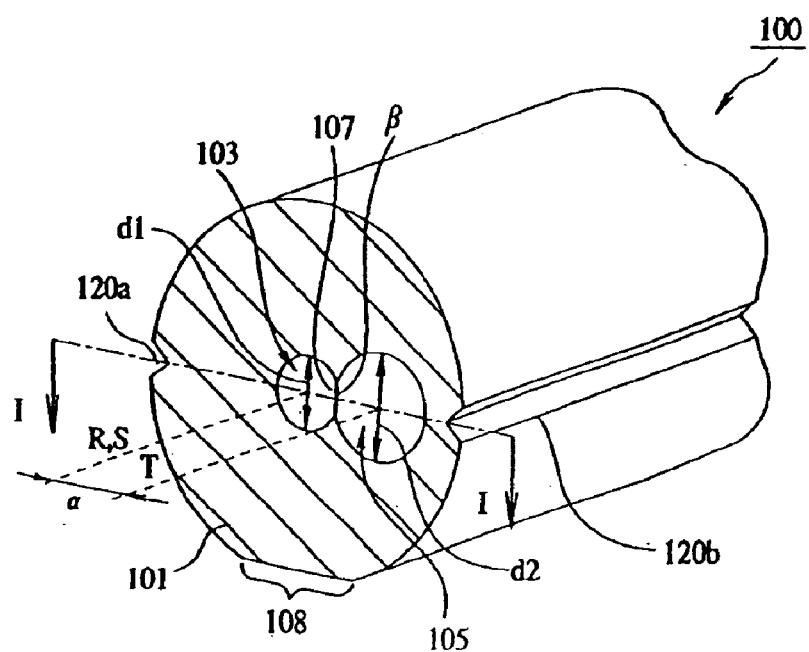
FIG. 6B is a diagram for describing a structural example of the mark portion of the present invention.

Furthermore, the mark portion may be structured as described below. FIG. 6A and FIG. 6B are respectively oblique perspective views focusing on a portion of an optical component with a different structure comprising a mark portion 120.

In this example of FIG. 6A, the mark portion 120 is configured with concave portions 120a and 120b provided to the holding member 101 at positions where a line I—I, which is the line linking the center axes S and T of the first and second through-holes 103 and 105 extending horizontally towards the outside of the holding member 101, intersects the surface (outer surface) of the holding member 101.

In this case, the line linking the center axes S and T is the shortest line linking therebetween. These concave portions may be utilized as installation mark portions when installing the optical component 100 according to the present invention to another arbitrary optical component, for example, the metallic tube 200 illustrated in FIG. 3C; wherein this installation of this optical component 100 according to the present invention to the metallic tube 200 is performed by applying to these concave portions 120a and 120b a dedicated jig (not shown in the drawing) having a predetermined relationship with the metallic tube 200, for example.

The shape and size of these concave portions may be preferably determined in view of the relationship with the aforementioned dedicated jig or the like. With this embodiment, the concave portions 120a and 120b are those with a v-shaped cross section orthogonal to the length of the holding member 101. Moreover, these concave portions 120a and 120b have dimensions capable of somewhat guiding the jig or the like along the length of the holding member 101.

Naturally, these concave portions 120a and 120b may be formed so as to reach the other terminal portion across the length of the holding member 101, or it may be formed across only part of the length thereof. Furthermore, these concave portions 120a and 120b are made to have a v-shaped cross section because it makes for easier positioning of the jig or the like when positioning another optical component. Naturally, the cross-sectional shape of these concave portions 120a and 120b is not limited to this example.

Furthermore, the mark portion may be configured with the reference surface 108 and the concave portions 120a and 120b described above (see FIG. 6B).

Furthermore, in order to implement this optical component invention, it is more preferable to provide a guide portion 109, which is a guide for inserting the first and second optical fibers to the first and second through-holes 103 and 105, respectively, to a terminal portion of the holding member 101, more specifically, the terminal portion on the side where these optical fibers are to be inserted, as illustrated in FIG. 3B and FIG. 3C.

The configuration of this guide portion 109 itself is not particularly limited as long as the aforementioned aim can be reached. However, it is preferable that the guide portion 109 is a concave portion (hereafter, also referred to as a hole) formed at an end of the holding member 101 on the side where the first and second optical fibers are to be inserted, and should be a hole having an opening 109a wider than the inlet of the first and second through-holes 103 and 105, as well as having a surface (an inclined plane) 109b inclined towards that inlet, as illustrated in FIG. 3B and FIG. 3C.

More preferably, it is preferable that a hole acting as the guide portion 109 is formed in the holding member with a positional relationship such that the center axis (overlaps the axis R in the example of FIG. 3C) of the hole 109 is included within the flat surface region (namely, the internal side of the outer circumference of the through-hole, which is referred to as within the flat surface region; where the inlet space of the through-hole is expressed as a flat surface) of the first through-hole 103, as illustrated in FIG. 3C.

Accordingly, the guide portion 109 is connected to the inlet of the first through-hole 103 at the deepest portion thereof, and is a hole with a structure to be connected to the inlet of the second through-hole 105 partway down the inclined plane 109b. Given the hole as described above, since it is easy to insert optical fibers into the through-holes 103 and 105, there are greatly positive influences in mass production.

The optical component 100 described above may be manufactured by casting ceramic material, which is used to fabricate the aforementioned translucent alumina ceramics for example, sintering this cast object, and smoothing at least the inner surface of the first through-hole 103 through wire polishing or the like.

It should be noted that the aforementioned optical component 100 is typically fixed by a holding member fixture such as a metallic tube and utilized. FIG. 3C is a diagram illustrating the configuration where the optical component 100 is fixed by the metallic tube 200, and is a cross section cut along the length of the metallic tube 200, and is also a cross section of the optical component 100 cut along the line I—I in FIG. 3A.

The metallic tube 200 comprises a first opening 201a, which has a predetermined inner diameter and is for storing the holding member 101 of the optical component 100, and a second opening 201b, which is linked to this first opening 201a and brings the first and the second optical fiber 11 and 13 into the holding member 101.

In this example, the holding member 101 is tubular, the cross section of the first opening 201a is a circular hole, and the inner diameter of the first opening 201a is slightly smaller than the outer diameter of the holding member 101, where the holding member 101 cannot be inserted into the first opening 201a by merely touching the holding member 101 thereto. However, the inner diameter of the first opening 201a is formed slightly smaller than the outer diameter of the holding member 101 to a certain degree such that the holding member 101 can be inserted into the opening 201a by driving in, and to a certain degree such that the holding member 101 inserted by driving in as such cannot be pulled out from the first opening 201a by merely applying normal pressure.

The inner diameter of the second opening 201b is formed smaller than that of the first opening 201a, where the boundary portion therebetween acts as a stopper when driving the holding member 101 into the first opening 201a.

A terminal portion of an optical fiber is configured by driving the holding member 101 into the first opening 201a of the metallic tube 200 so as to form a ferrule, inserting the end of the optical fiber, which has its covering removed from the tip, from the inlet of the second opening 201b, inserting the end configured from a core and cladding into a specified through-hole of the holding member 101, and fixing the optical fiber to the holding member 101 by adhesive.

The aforementioned holding member fixture is capable of holding at least one holding member, and the aforementioned holding member insert is not limited to having an opening with a circular cross section.

Furthermore, instead of the metallic tube 200, a tube configured from an arbitrary preferred material other than metal such as ceramics may be used.

The holding member fixture may also be made of the same translucent ceramics as the holding member 101, which is considered a fundamental feature of the present invention.

It should be noted that when utilizing the optical component 100 by inserting into the metallic tube 200, a tapering 100c should be provided to the end of the optical component 100 on the side to be inserted into the metallic tube 200 for facilitating insertion thereof into the metallic tube 200.

It is preferable that the optical component 100 is attached to the metallic tube 200 such that a portion thereof is exposed from the metallic tube 200. The reason for exposing a portion of the optical component 100 from the metallic tube 200 is that if a portion of the optical component 100 is exposed during the operation of polishing the end face of the optical fiber, followed by insertion of the optical fiber into the optical component 100, so as to make the surface tilted at a specified angle (for example, 8 degrees with respect to the surface perpendicular to the center axis of the optical fiber) as mentioned above, thereby further reducing the effects of return light such as return loss or a fuse phenomenon, the aforementioned polishing is easier to perform with high reliability.

Exposing a portion of the optical component 100 from the metallic tube 200 is of course not essential. Furthermore, the optical component 100 may be utilized without inserting into the metallic tube 200.

Next, the functions and effects of the aforementioned optical component 100 will be described while referencing FIG. 4. FIG. 4 is a partial oblique perspective view illustrating a configuration where the first optical fiber 11 and the second optical fiber 13 are inserted into the first and the second through-hole 103 and 105 of the optical component 100 illustrated in FIGS. 3A to 3C, an optical fiber-fixing adhesive 110 is injected into these through-holes 103 and 105, and this adhesive is hardened. It should be noted that with the description forthwith, an exemplary operation of inserting the first and second optical fibers 11 and 13 into the holding member 15 is also described at the same time.

The optical fiber end is pressed against the guide portion 109 of the optical component 100 as described using FIG. 3. An optical fiber, for example, the first optical fiber 11 is inserted into the first through-hole 103, and the second optical fiber 13 is inserted into the second through-hole 105 by the help of the guide portion 109.

Next, the optical fiber-fixing adhesive 110 is injected into either one or both of the first and second through-holes 103 and 105. An arbitrary preferred adhesive may be used as this adhesive 110. Furthermore, for the adhesive, a thermosetting adhesive or a thermoplastic adhesive may be used.

For example, an epoxy liquid adhesive may be provided. The adhesive to be used has a viscosity allowing facilitation of the aforementioned injection. For example, a viscosity of approximately 2000 cps is favorable. Furthermore, the aforementioned injection of the adhesive may be performed using an arbitrary preferred tool such as a syringe or a dispenser.

Since the inner diameter of the second through-hole 105 is relatively larger than that of the second optical fiber 13, once the adhesive 110 is injected, the second optical fiber 13 can move within the second through-hole 105 due to the surface tension of the adhesive. On the other hand, since the inner diameter of the first through-hole 103 is slightly larger than that of the first optical fiber 11, the first optical fiber 11 is almost in a fixed state within the first through-hole 103.

In a typical case of two lines or wires to which a liquid such as adhesive is adhered where one line or wire is fixed, and the other line or wire is movable, the movable line or wire is drawn towards the fixed line or wire due to the surface tension and viscosity of the liquid adhered to two lines or wires. Accordingly, since the second optical fiber 13, as illustrated in FIG. 4, is drawn towards the first optical fiber 11 and approaches the vicinity thereof, the outer surfaces of the first and second optical fibers 11 and 13 touch or become close to each other at the slit 107 due to the adhesive. Namely, the first optical fiber 11 is positioned on the axis of the holding member 101, as well as the first and second optical fibers 11 and 13 are fixed to the holding member 101 in mutually parallel and adjacent states. It is best to harden this adhesive injected into the through-holes in this state according to specified hardening conditions.

Accordingly, with the first optical fiber 11 inserted and fixed to the holding member 101 at the level of its axis, as well as the second optical fiber 13 in a state parallel and adjacent to this first optical fiber 11, an optical component having the second optical fiber 13 fixed to the holding member 101 is obtained.

It should be noted that during the manufacturing procedures for inserting and fixing the first and the second optical fiber 11 and 13 in the optical component 100, the second optical fiber 13 is preferably handled such that force limiting the movement of a portion of the second optical fiber 13 within the second through-hole 105 in which the second optical fiber 13 is to be inserted cannot be applied.

Once the first and the second optical fiber 11 and 13 are inserted and fixed in the holding member 101 as mentioned above, an end face of the optical component 100 is formed by polishing the ends of these optical fibers 11 and 13 and the holding member 101. This end face is preferably made to be a surface with an 8 degree tilt to the surface perpendicular to axis R, for example. Given such tilted end face, return loss may be further reduced.

The optical fiber that utilizes the optical component 100 described while referencing FIG. 4 has a terminal portion structure, which is formed by inserting a plurality of ends of the optical fibers 11 and 13 into a plurality of the through-holes 103 and 105 with circular cross-sectional shapes formed in the holding member 101. Furthermore, it is a structure where the first through-hole 103 and the second through-hole 105 differing in inner diameters are formed being mutually parallel and adjacent in the holding member 101, as well as the slit 107, which links the first through-hole 103 and the second through-hole 105 at the tangent boundary therebetween, is formed along these through-holes.

Furthermore, the ends of the optical fibers 11 and 13 inserted in these through-holes 103 and 105, respectively, are structured where the adhesive 110 injected into the through-holes 103 and 105 is hardened and adhered such that the outer surface of the end of the optical fiber 13, which is inserted into the second through-hole 105, touches or is adjacent to and is fastened at the slit 107 to the outer surface of the end of the optical fiber 11 that is inserted into the first through-hole 103 while rubbing the internal surface of the first through-hole 103, where the first through-hole 103 is formed with a smaller internal diameter than that of the second through-hole 105.

An example of the optical component of an embodiment of the present invention has been described thus far; however, the present invention is not limited in any way thereto, where further additional modifications or improvements may be made without departing from the scope of the present invention.

For example, an exemplary optical component with the first and the second through-hole 103 and 105 provided to the holding member 101 has been described with the embodiment described above; however, it may have a structure where the holding member 101 is provided with three or more through-holes. Namely, it may be a structure where the holding member 101 further comprises a third through-hole (if necessary, a fourth through-hole or more) linked to the first through-hole 103 via a slit based on the same philosophy as with the second through-hole 105.

Figure 5:
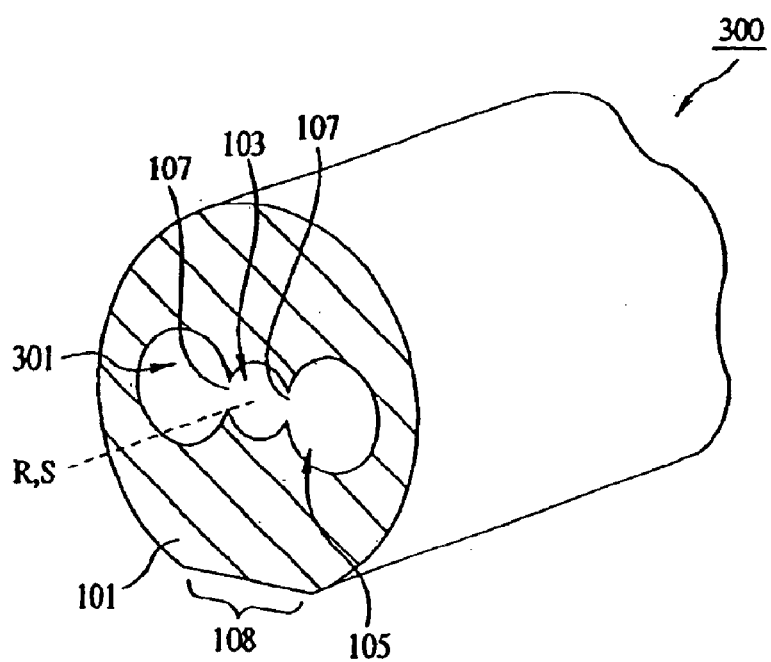
FIG. 5 is a diagram for describing an optical component of an embodiment of the present invention.

FIG. 5 is a diagram illustrating an optical component 300 further comprising a third through-hole 301 using a partial oblique perspective view thereof. In the case of the example of FIG. 5, the third through-hole 301 is provided at a position symmetrical to the second through-hole 105 centering on the first through-hole 103. However, the position of the third through-hole 301 is not limited to this example.

Preferred values for the diameter of this third through-hole 301, the width of the slit 107 formed between the first through-hole 103 and the third through-hole 301, and the center axis distance therebetween may be set as the same values as with the second through-hole 105, for example.

Furthermore, in the case of this example of FIG. 5, the reference surface 108 is a flat surface intersecting at least one end face of the holding member 101, where the intersecting line of the end face and the flat surface is given as a flat surface parallel to the line linking the center axes of the first, second and third through-holes 103, 105 and 301 at the aforementioned one end face.

Naturally, instead of this flat surface, a flat surface perpendicular to this flat surface may be formed along at least a part of the circumference of the holding member, where the formed flat surface is used as the reference surface. Alternatively, instead of the reference surface 108, or in combination with the reference surface 108 of the holding member 101, a mark portion may be formed by providing the same concave portions 120a and 120b as those described using FIG. 6.

Furthermore, the width of the slit 107 provided between the first through-hole 103 and the second through-hole 105 is preferably almost uniform along the length of the first through-hole 103, and the same applies to the case for the slit provided between the first through-hole 103 and the third through-hole 301. However, the width of the slit 107 may also vary in places along the length of the first through-hole 103.

Embodiments with particularly great effects of the present invention using translucent ceramics have been described thus far using FIGS. 3A through 3C, 4, 5, and 6; and are extremely favorable embodiments where the optical components described using each of the aforementioned drawings do not generate any cracks along the diameter of the fibers that existed in plurality in the case of two or more capillary tubes with one hole to which more than two optical fibers are inserted, and do not generate optical coupling loss due to micro-bending that may occur within through-holes of two fibers, for example, and in addition, is also capable of making the return loss be significantly small.

The optical component of the present invention may also have four or more through-holes. That structure may take many forms such as positioning one through-hole so that the center line of that through-hole and the axis of the holding member coincide at the center thereof, and the other through-holes are positioned therearound. Applying the present invention to an optical component capable of implementing an optical fiber with high positional accuracy as mentioned above is particularly desirable for considerably increasing the effects of the present invention.

Furthermore, the optical component of this invention is preferably used when inserting and fixing a light signal optical fiber and a pump light optical fiber under specified conditions, however, it may also be utilized for other arbitrary preferred applications. There are various applications such as not inserting an optical fiber into one out of a plurality of through-holes that are provided to the holding member, for example, thus contributing to the reduction in return loss.

As is apparent from the above description, the optical component according to the present invention is characterized by a holding member having through-holes capable of inserting and holding optical fibers and providing a greatly reduced return loss, which is formed by sintering an ultra-pure alumina with more than 99.95% weight ratio composition such as to increase the crystal grain diameter, and using a translucent ceramics. This means that this type of utilization had not been conventionally considered in any way.

Yet another example with considerably great effects of the present invention is featured by the optical component shape comprising a holding member; a first through-hole with a circular cross-sectional shape to which a first optical fiber is to be inserted; a second through-hole, which is formed in the holding member with a positional relationship where a slit having a width less than the diameter of the first through-hole is linked to the first through-hole such that it is formed along the length of the first through-hole, has a diameter larger than that of the first through-hole, and to which a second optical fiber is to be inserted; and the slit.

Furthermore, in the example with considerably great effects described above, the width of the slit linking the first and the second through-hole is smaller than the diameter of the first optical fiber, thus the first optical fiber inserted into the first through-hole does not disengage from therewithin. Furthermore, according to this optical component according to the present invention, it is possible to form the first through-hole in the holding member such that within the portion from at least one end thereof for a specified length (particularly preferred to cross the entire length) the center axis of the first through-hole coincides with the axis of the holding member.

Therefore, the portion of the optical fiber to be inserted into the first through-hole equivalent to at least the aforementioned specified length, may be inserted and fixed to the holding member such that the center axis of the first through-hole coincides with the axis of the holding member.

Moreover, since a slit is provided between the first through-hole and the second through-hole, in the case where a liquid adhesive for fixing optical fiber is injected into these through-holes after optical fibers are inserted therein, the second optical fiber is more easily made parallel to the first optical fiber by the help of surface tension of the adhesive and the aforementioned slit.

Moreover, the hole diameter of the second through-hole and the manufacturing tolerance thereof may be made relatively large as mentioned above. Since the hole diameter of the second through-hole can be large, manufacturing of the optical component is facilitated, and inserting of the optical fiber into the second through-hole also becomes easy.

Consequently, according to the particularly favorable example of the present invention, the first and the second optical fiber can be inserted and fixed parallel to each other and with a predetermined relationship, the degree of optical coupling can be significantly increased, the return loss can be ideally reduced combined with the effects of the translucent ceramics of the holding member, and an optical component can be easily manufactured at low cost with good mass production yield.

Currently in the field of optical communication, there are various improvements and devices being implemented for wavelengths in the wavelength spectrum of 1.2 to 1.7 $\mu$m. As examples of the wavelength bands, there are those referred to as the O-band (1260 to 1360 nm), E-band (1360 to 1460 nm), S-band (1460 to 1530 nm), C-band (1530 to 1565 nm), L-band (1565 to 1625 nm), and U-band (1625 to 1675 nm). However, many alternative communication devices have been used and developed due to various reasons. In addition, along with development in optical communication, transmitting more information at high speed and low cost is favorable. Transmitting at an ultra-high speed transmission rate of 40 Gbps (40 gigabits per second) is considered as a solution thereof. However, dispersion due to optical fibers that is not a problem with current communication of transmitting through optical fibers at 2.5 Gbps, becomes a big problem at 40 Gbps. Namely, if long distance optical communication is carried out at 40 Gbps, it is reported that implementation is impossible without compensating for the third-order dispersion. As a method for compensating third-order dispersion, there is a method implemented utilizing several optical dispersion compensating devices that use dielectric multilayer films.

For example, in order to carry out accurate communication for transmitting over a long distance on the order of 10,000 km at 40 Gbps using optical fiber that is currently utilized for optical communication, a plurality of optical dispersion compensating devices are required. For example, if third-order dispersion is attempted to be compensated with communication in the C-band of a wavelength band of 15 nm or 30 nm, several tens of the aforementioned optical dispersion compensating devices that use dielectric multilayer films are required to be connected in series.

With ultra-high speed long distance optical communication, besides third-order dispersion compensation, the conventionally reported second-order dispersion compensation is required.

The necessity for serially connecting several rows of dispersion compensating devices in the communication path arises; however, the loss and S/N ratio at that time is a key issue. For optical fiber connections when arranging along the optical fiber necessary devices such as dispersion compensating devices or amplifiers, connections using fusion splicing or optical connectors are established, however, when using an optical connector, the return loss must be reduced to a minimum. The optical component of the present invention is one to provide at low cost an optical connector having little return loss with high reliability and under conditions allowing mass production.

Furthermore, a laser with a pulse width of a 100 fs (femtosecond) ultrashort light pulse width at a wavelength between 0.5 to 1 $\mu$m is used for, for example, medical research that utilizes two-photon absorption; however, even with a high-intensity laser with such ultrashort light pulse width, the return loss at the optical fiber connector is a big problem.

The optical component of the present invention is widely utilized in this kind of optical communication or in fields of application for laser beam devices such as medical care, and demonstrates great results as mentioned earlier.

INDUSTRIAL APPLICABILITY

The present invention has been described in detail thus far. It provides a highly-reliable optical component having extremely little return loss under conditions suitable for mass production and at low cost, and can configure an optical fiber terminal portion by manufacturing an optical component that comprises a through-hole capable of holding an optical fiber using translucent ceramics, and using it independently or in the form of a ferrule held by a tubular metallic component or the like.

The optical component of the present invention can be widely used for optical communication. Specifically, it demonstrates great results through being applied to ultrashort light pulse width lasers, connecting portions in large power optical transmission, and connecting portions in optical communication requiring a good S/N ratio. In addition, the optical component of the present invention can naturally be used as the optical fiber connector at the optical connecting portions where return loss was unquestioned, and that can also substitute for a conventional capillary tube or ferrule using zirconia, where the industrial applicable fields thereof are extremely broad.

What is claimed is:

1. An optical component comprising:
   a holding member made of translucent ceramics for holding the vicinity of an end of an optical fiber; and
   a through-hole formed in said holding member and into which an optical fiber is to be inserted, wherein the average crystal grain diameter of the translucent ceramics configuring said holding member is 20 $\mu$m or greater, and the diameter of each crystal grain within the portion making up at least 50% of the translucent ceramics volume lies between 10 and 40 $\mu$m.

2. An optical component comprising:
   a holding member made of translucent ceramics for holding the vicinity of an end of an optical fiber; and
   a through-hole formed in said holding member into which an optical fiber is to be inserted, wherein total transmittance that is the ratio of the total amount of light passing through said holding member to the total amount of incident light is at least 0.8, namely 80% for light of wavelengths between 0.3 and 5 $\mu$m, and linear transmittance, which is transmittance in the direction to which the incident light progresses through said holding member, is at least 0.15/mm, namely 15% per 1 mm in thickness for light of wavelengths between 0.5 and 2 $\mu$m.

3. The optical component according to claim 1, wherein 99.9% or greater of alumina ($Al_2O_3$) and 200 to 300 ppm magnesium (Mg) by weight are included in the translucent ceramics as the principal components thereof.

4. The optical component according to claim 1, wherein said through-hole is a single through-hole.

5. The optical component according to claim 1, wherein said holding member includes at least two through-holes.

6. The optical component according to claim 4, wherein said through-hole is formed in said holding member such that the center axis of said through-hole coincides with the axis of said holding member.

7. The optical component according to claim 5, wherein at least one of said through-holes has a circular cross section.

8. The optical component according to claim 5, wherein said at least two through-holes include:
   a first through-hole and;
   a second through-hole having a diameter greater than a diameter of said first through-hole formed in said holding member and wherein said holding member further comprises:
   a slit having a width less than the diameter of said first through-hole formed between said first and said second through-holes along at least a part of the length of said first through-hole.

9. The optical component according to claim 8, wherein the width of said slit is no greater than 70% of the diameter of said first through-hole.

10. The optical component according to claim 8, wherein the width of said slit is at least 20% of the diameter of said first through-hole.

11. The optical component according to claim 8, wherein the width of said slit is between 20% and 70% of the diameter of said first through-hole.

12. The optical component according to claim 8, wherein said first through-hole is formed so that a portion of the longitudinal axis of said first through-hole coincides with a portion of the center axis of said holding member.

13. The optical component according to claim 8, wherein said second through-hole is formed in said holding member such that said slit is formed with a uniform width across the entire length of said first through-hole.

14. The optical component according to claim 8, wherein the upper limit for the diameter of said second through-hole is determined within a range such that when a liquid adhesive is injected into at least one of said first and said second through-hole in a state where an optical fiber is inserted into each of said first and said second through-holes, the surface tension of said adhesive makes the optical fiber within said second through-hole be parallel and close to the optical fiber within said first through-hole.

15. The optical component according to claim 8, wherein said first through-hole and said second through-hole are formed in parallel and are adjacent to each other, and said slit is formed along said through-holes such that the outer surface of a second optical fiber inserted into said second through-hole is adjacent to the outer surface of a first optical fiber inserted into said first through-hole while contacting the internal surface of said first through-hole, and said first through-hole is formed in said holdiag member such that the center axis of said first through-hole coincides with the axis of said holding member.

16. The optical component according to claim 8, wherein said holding member has at least one mark portion such as a reference surface.

17. The optical component according to claim 8, wherein said holding member has a guide portion for inserting an optical fiber into said first and said second through-holes provided at an end of said holding member, wherein said guide portion is a hole formed at the end of said holding member on the side where the optical fiber is to be inserted, and has a wider opening than the inlet of said first and said second through-holes, as well as having a surface inclined towards said inlet.

18. The optical component according to claim 8, wherein the distance between longitudinal axes of said first and said second through-holes is between 119 $\mu$m and 132 $\mu$m, the diameter of said first through-hole is between 125 $\mu$m and 129 $\mu$m, and the diameter of said second through-hole is at least 130 $\mu$m.

19. The optical component according to claim 8, wherein said holding member is provided with a third through-hole having a diameter greater than a diameter of said first through-hole which communicates with said first through-hole by way of a slit having a width less than the diameter of said first through-hole formed along the length of said first through-hole.

20. The optical component according to claim 18, wherein the diameter of said second through-hole is between 140 $\mu$m and 156 $\mu$m.

21. The optical component according to claim 18, wherein the width of said slit is at least 30 $\mu$m.

22. The optical component according to claim 18, wherein the width of said slit is no greater than 80 $\mu$m.

23. The optical component according to claim 18, wherein the width of said slit is between 30 $\mu$m and 80 $\mu$m.

24. The optical component according to claim 19, wherein the distance between longitudinal axes of said first and said third through-holes is between 119 μm and 132 μm, the diameter of said first through-hole is between 125 μm and 129 μm, and the diameter of said third through-hole is at least 130 μm.

25. The optical component according to claim 24, wherein the diameter of said third through-hole is between 140 μm and 156 μm.

26. The optical component according to claim 24, wherein the width of said slit formed between said first through-hole and said third through-hole is no greater than 80 μm.

27. The optical component according to claim 24, wherein the width of said slit formed between said first through-hole and said third through-hole is at least 30 μm.

28. The optical component according to claim 24, wherein the width of said slit formed between said first through-hole and said third through-hole is between 30 μm and 80 μm.

29. The optical component according to claim 2, wherein said through-hole is a single through-hole.

30. The optical component according to claim 2, wherein said holding member has at least two through-holes.

31. The optical component according to claim 29, wherein said through-hole is formed in said holding member such that the center axis of said through-hole coincides with the axis of said holding member.

32. The optical component according to claim 30, wherein at least one of said through-holes has a circular cross section.

33. The optical component according to claim 30, wherein said at least two through-holes include:
   a first through-hole and;
   a second through-hole having a diameter greater than a diameter of said first through-hole formed in said holding member and wherein said holding member further comprises:
   a slit having a width less than the diameter of said first through-hole formed between said first and said second through-holes along at least a part of the length of said first through-hole.

34. The optical component according to claim 33, wherein the width of said slit is no greater than 70% of the diameter of said first through-hole.

35. The optical component according to claim 33, wherein the width of said slit is at least 20% of the diameter of said first through-hole.

36. The optical component according to claim 33, wherein the width of said slit is between 20% and 70% of the diameter of said first through-hole.

37. The optical component according to claim 33, wherein said first through-hole is formed so that a portion of the longitudinal axis of said first through-hole coincides with a portion of the center axis of said holding member.

38. The optical component according to claim 33, wherein said second through-hole is formed in said holding member such that said slit is formed with a uniform width across the entire length of said first through-hole.

39. The optical component according to claim 33, wherein the upper limit for the diameter of said second through-hole is determined within a range such that when a liquid adhesive is injected into at least one of said first and said second through-holes in a state where an optical fiber is inserted into each of said first and said second through-holes, the surface tension of said adhesive makes the optical fiber within said second through-hole be parallel and close to the optical fiber within said first through-hole.

40. The optical component according to claim 33, wherein said first through-hole and said second through-hole are formed in parallel and are adjacent to each other, and said slit is formed along said through-holes such that the outer surface of a second optical fiber inserted into said second through-hole is adjacent to the outer surface of a first optical fiber inserted into said first through-hole while contacting the internal surface of said first through-hole, and said first through-hole is formed in said holding member such that the center axis of said first through-hole coincides with the axis of said holding member.

41. The optical component according to claim 33, wherein said holding member has at least one mark portion such as a reference surface.

42. The optical component according to claim 33, wherein said holding member has a guide portion for inserting an optical fiber into said first and said second through-holes, provided at an end of said holding member, wherein the guide portion is a hole formed at the end of said holding member on the side where the optical fiber is to be inserted, and has a wider opening than the inlet of said first and said second through-holes, as well as having a surface inclined towards the inlet.

43. The optical component according to claim 33, wherein the distance between longitudinal axes of said first and said second through-holes is between 119 μm and 132 μm, the diameter of said first through-hole is between 125 μm and 129 μm, and the diameter of said second through-hole is at least 130 μm.

44. The optical component according to claim 33, wherein said holding member is provided with a third through-hole having a diameter greater than a diameter of said first through-hole which communicates with said first through-hole by way of a slit having a width less than the diameter of said first through-hole formed along the length of said first through-hole.

45. The optical component according to claim 43, wherein the diameter of said second through-hole is between 140 μm and 156 μm.

46. The optical component according to claim 43, wherein the width of said slit is at least 30 μm.

47. The optical component according to claim 43, wherein the width of said slit is no greater than 80 μm.

48. The optical component according to claim 43, wherein the width of said slit is between 30 μm and 80 μm.

49. The optical component according to claim 44, wherein the distance between longitudinal axes of said first and said third through-holes is between 119 μm and 132 μm, the diameter of said first through-hole is between 125 μm and 129 μm, and the diameter of said third through-hole is at least 130 μm.

50. The optical component according to claim 49, wherein the diameter of said third through-hole is between 140 μm and 156 μm.

51. The optical component according to claim 49, wherein the width of said slit formed between said first through-hole and said third through-hole is no greater than 80 μm.

52. The optical component according to claim 49, wherein the width of said slit formed between said first through-hole and said third through-hole is at least 30 μm.

53. The optical component according to claim 49, wherein said width of said slit formed between said first through-hole and said third through-hole is between 30 μm and 80 μm.

54. The optical component according to claim 3, wherein the alumina ($Al_2O_3$) content by weight in the translucent ceramics configuring said holding member is 99.95% or greater, and the magnesium (Mg) content by weight is approximately 250 ppm.

55. An optical component, which holds the vicinity of an end of an optical fiber, comprising:
   a holding member, which is made of translucent ceramics and holds an optical fiber inserted therein; and
   a holding member fixture, which has a holding member insert for inserting, fixing and holding said holding member, wherein said holding member is provided with a through-hole into which an optical fiber is inserted and held, the average crystal grain diameter of the translucent ceramics configuring said holding member is 20 μm or greater, and the diameter of each crystal grain within the portion making up at least 50% of the translucent ceramics volume lies between 10 and 40 μm.

56. The optical component according to claim 53, wherein said holding member insert is a hole made in said holding member fixture.

57. The optical component according to claim 53, wherein said holding member insert is provided with a hollow portion that allows said holding member to be fixed and held in said holding member insert by inserting said holding member into said holding member insert by at least one of a press fit and drive means without using an adhesive.

58. The optical component according to claim 53, wherein 99.9% or greater of alumina ($Al_2O_3$) and 200 to 300 ppm magnesium (Mg) by weight are included in the translucent ceramics configuring said holding member as the principal components thereof.

59. The optical component according to claim 55, wherein said through-hole is a single through-hole.

60. The optical component according to claim 55, wherein at least two through-holes are provided.

61. The optical component according to claim 59, wherein said through-hole is formed in said holding member such that the center axis of said through-hole coincides with the axis of said holding member.

62. The optical component according to claim 60, wherein at least one of said through-holes has a circular cross section.

63. The optical component according to claim 60, wherein said at least two through-holes include:
a first through-hole and;
a second through-hole having a diameter greater than a diameter of said first through-hole formed in said holding member and wherein said holding member further comprises:
a slit having a width less than the diameter of said first through-hole formed between said first and said second through-holes along at least a part of the length of said first through-hole.

64. The optical component according to claim 63, wherein the width of said slit is no greater than 70% of the diameter of said first through-hole.

65. The optical component according to claim 63, wherein the width of said slit is at least 20% of the diameter of said first through-hole.

66. The optical component according to claim 63, wherein the width of said slit is between 20% and 70% of the diameter of said first through-hole.

67. The optical component according to claim 63, wherein said first through-hole is formed so that a portion of the longitudinal axis of said first through-hole coincides with a portion of the center axis of said holding member.

68. The optical component according to claim 63, wherein said second through-hole is formed in said holding member such that said slit is formed with a uniform width across the entire length of said first through-hole.

69. The optical component according to claim 63, wherein the upper limit for the diameter of said second through-hole is determined within a range such that when a liquid adhesive is injected into at least one of said first and said second through-hole in a state where an optical fiber is inserted into each of said first and said second through-holes, the surface tension of said adhesive makes the optical fiber within said second through-hole be parallel and close to the optical fiber within said first through-hole.

70. The optical component according to claim 63, wherein said first through-hole and said second through-hole are formed in parallel and are adjacent to each other, and said slit is formed along said through-holes such that the outer surface of a second optical fiber inserted into said second through-hole is adjacent to the outer surface of a first optical fiber inserted into said first through-hole while contacting the internal surface of said first through-hole, and said first through-hole is formed in said holding member such that the center axis of said first through-hole coincides with the axis of said holding member.

71. The optical component according to claim 63, wherein said holding member has at least one mark portion such as a reference surface.

72. The optical component according to claim 63, wherein said holding member has a guide portion for inserting an optical fiber into said first and said second through-holes, provided at an end of said holding member, wherein said guide portion is a hole formed at the end of said holding member on the side where the optical fiber is to be inserted, and has a wider opening than the inlet of said first and said second through-holes, as well as having a surface inclined towards the inlet.

73. The optical component according to claim 63, wherein the distance between longitudinal axes of said first and said second through-holes is between 119 μm and 132 μm, the diameter of said first through-hole is between 125 μm and 129 μm, and the diameter of said second through-hole is at least 130 μm.

74. The optical component according to claim 63, wherein said holding member is provided with a third through-hole having a diameter greater than a diameter of said first through-hole which communicates with said first through-hole by way of a slit having a width less than the diameter of said first through-hole formed along the length of said first through-hole.

75. The optical component according to claim 73, wherein the diameter of said second through-hole is between 140 μm and 156 μm.

76. The optical component according to claim 73, wherein the width of said slit is at least 30 μm.

77. The optical component according to claim 73, wherein the width of said slit is no greater than 80 μm.

78. The optical component according to claim 73, wherein the width of said slit is between 30 μm and 80 μm.

79. The optical component according to claim 74, wherein the distance between longitudinal axes of said first and said third through-holes is between 119 μm and 132 μm, the diameter of said first through-hole is between 125 μm and 129 μm, and the diameter of said third through-hole is at least 130 μm.

80. The optical component according to claim 79, wherein the diameter of said third through-hole is between 140 μm and 156 μm.

81. The optical component according to claim 79, wherein the width of said slit formed between said first through-hole and said third through-hole is no greater than 80 μm.

82. The optical component according to claim 79, wherein the width of said slit formed between said first through-hole and said third through-hole is at least 30 μm.

83. The optical component according to claim 79, wherein the width of said slit formed between said first through-hole and said third through-hole is between 30 μm and 80 μm.

84. The optical component according to claim 57, wherein said holding member fixture has through-holes configured from a first hole made in said holding member fixture, which is said holding member insert, and a second hole, which is subsequently formed.

85. The optical component according to claim 57, wherein said holding member fixture is made of metal, a part of an optical fiber protruding from said holding member is inserted into said second hole, and the internal diameter of said first hole is slightly smaller than the external diameter of said holding member.

86. The optical component according to claim 58, wherein the alumina ($Al_2O_3$) content by weight in the translucent ceramics configuring said holding member is 99.95% or greater, and the magnesium (Mg) content by weight is approximately 250 ppm.

87. The optical component according to claim 58, wherein total transmittance that is the ratio of the total amount of light passing through the translucent ceramics to the total amount of incident light is at least 0.8, namely 80% for light of wavelengths between 0.3 and 5 µm, and linear transmittance, which is transmittance in the direction to which the incident light progresses through the translucent ceramics configuring said holding member, is at least 0.15/ mm, namely 15% per 1 mm in thickness for light of wavelengths between 0.5 and 2 µm.

88. The optical component according to claim 58, wherein said through-hole is a single through-hole.

89. The optical component according to claim 58, wherein said holding member includes at least two through-holes.

90. The optical component according to claim 88, wherein said through-hole is formed in said holding member such that the center axis of said through-hole coincides with the axis of said holding member.

91. The optical component according to claim 89, wherein at least one of said through-holes has a circular cross section.

92. The optical component according to claim 89, wherein said at least two through-holes include:
 a first through-hole and;
 a second through-hole having a diameter greater than a diameter of said first through-hole formed in said holding member and wherein said holding member further comprises:
 a slit having a width less than the diameter of said first through-hole formed between said first and said second through-holes along at least a part of the length of said first through-hole.

93. The optical component according to claim 92, wherein the width of said slit is no greater than 70% of the diameter of said first through-hole.

94. The optical component according to claim 92, wherein the width of said slit is at least 20% of the diameter of said first through-hole.

95. The optical component according to claim 92, wherein the width of said slit is between 20% and 70% of the diameter of said first through-hole.

96. The optical component according to claim 92, wherein said first through-hole is formed so that a portion of the longitudinal axis of said first through-hole coincides with a portion of the center axis of said holding member.

97. The optical component according to claim 92, wherein said second through-hole is formed in said holding member such that said slit is formed with a uniform width across the entire length of said first through-hole.

98. The optical component according to claim 92, wherein the upper limit for the diameter of said second through-hole is determined within a range such that when a liquid adhesive is injected into at least one of said first and said second through-hole in a state where an optical fiber is inserted into each of said first and said second through-holes, the surface tension of said adhesive makes the optical fiber within said second through-hole be parallel and close to the optical fiber within said first through-hole.

99. The optical component according to claim 92, wherein said first through-hole and said second through-hole are formed in parallel and are adjacent to each other, and said slit is formed along said through-holes such that the outer surface of a second optical fiber inserted into said second through-hole is adjacent to the outer surface of a first optical fiber inserted into said first through-hole while contacting the internal surface of said first through-hole, and said first through-hole is formed in said holding member such that the center axis of said first through-hole coincides with the axis of said holding member.

100. The optical component according to claim 92, wherein said holding member has at least one mark portion such as a reference surface.

101. The optical component according to claim 92, wherein said holding member has a guide portion for inserting an optical fiber into said first and said second through-holes, provided at an end of said holding member, wherein said guide portion is a hole formed at the end of said holding member on the side where the optical fiber is to be inserted, and has a wider opening than the inlet of said first and said second through-holes, as well as having a surface inclined towards said inlet.

102. The optical component according to claim 92, wherein the distance between longitudinal axes of said first and said second through-holes is between 119 µm and 132 µm, the diameter of said first through-hole is between 125 µm and 129 µm, and the diameter of said second through-hole is at least 130 µm.

103. The optical component according to claim 92, wherein said holding member is provided with a third through-hole having a diameter greater than a diameter of said first through-hole which communicates with said first through-hole by way of a slit having a width less than the diameter of said first through-hole formed along the length of said first through-hole.

104. The optical component according to claim 102, wherein the diameter of said second through-hole is between 140 µm and 156 µm.

105. The optical component according to claim 102, wherein the width of said slit is at least 30 µm.

106. The optical component according to claim 102, wherein the width of said slit is no greater than 80 µm.

107. The optical component according to claim 102, wherein the width of said slit is between 30 µm and 80 µm.

108. The optical component according to claim 103, wherein the distance between longitudinal axes of said first and said third through-holes is between 119 µm and 132 µm, the diameter of said first through-hole is between 125 µm and 129 µm, and the diameter of said third through-hole is at least 130 µm.

109. The optical component according to claim 108, wherein the diameter of said third through-hole is between 140 µm and 156 µm.

110. The optical component according to claim 108, wherein the width of said slit formed between said first through-hole and said third through-hole is no greater than 80 µm.

111. The optical component according to claim 108, wherein the width of said slit formed between said first through-hole and said third through-hole is at least 30 µm.

112. The optical component according to claim 108, wherein the width of said slit formed between said first through-hole and said third through-hole is between 30 µm and 80 µm.

* * * * *